United States Patent
Jinno et al.

(10) Patent No.: US 12,450,826 B2
(45) Date of Patent: Oct. 21, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Takayuki Jinno, Kanagawa (JP); Chika Fujiwara, Kanagawa (JP); Masaharu Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 18/353,288

(22) Filed: Jul. 17, 2023

(65) Prior Publication Data
US 2024/0029343 A1 Jan. 25, 2024

(30) Foreign Application Priority Data
Jul. 21, 2022 (JP) .................................. 2022-116600

(51) Int. Cl.
*G06T 15/50* (2011.01)
*G06V 10/60* (2022.01)

(52) U.S. Cl.
CPC ............ *G06T 15/506* (2013.01); *G06V 10/60* (2022.01)

(58) Field of Classification Search
CPC ............... G06V 10/60; G06T 15/506
See application file for complete search history.

(56) References Cited

U.S. PATENT DOCUMENTS

| | | | | |
|---|---|---|---|---|
| 2001/0017626 | A1* | 8/2001 | Lindholm | G06T 15/005 345/501 |
| 2017/0203526 | A1* | 7/2017 | Asahara | G02B 5/23 |
| 2017/0268990 | A1* | 9/2017 | Martinello | G01N 21/57 |
| 2018/0108154 | A1* | 4/2018 | Miyoshi | G06T 19/00 |
| 2018/0122100 | A1* | 5/2018 | Totsuka | G06T 7/97 |
| 2018/0370255 | A1* | 12/2018 | Kubo | G06K 15/1868 |
| 2019/0266788 | A1* | 8/2019 | Huynh-Thu | G06F 30/10 |
| 2020/0274985 | A1* | 8/2020 | Yanai | H04N 1/603 |

FOREIGN PATENT DOCUMENTS

JP 2005149390 A 6/2005

OTHER PUBLICATIONS

"C: How Do I Change Bits in Specific Positions to Specific Values?—Stack Overflow." Stack Overflow, stackoverflow.com/questions/53478679/c-how-do-i-change-bits-in-specific-positions-to-specific-values. Accessed May 8, 2025. (Year: 2018).*

* cited by examiner

Primary Examiner — Kee M Tung
Assistant Examiner — Nauman U Ahmad
(74) Attorney, Agent, or Firm — Canon U.S.A., Inc. IP Division

(57) ABSTRACT

An information processing apparatus includes one or more memories and one or more processors. The one or more processors and the one or more memories are configured to acquire material appearance information including specular reflection information, convert the specular reflection information to an intensity of perception in accordance with visual characteristics for a gloss intensity, and resample the intensity of perception.

17 Claims, 30 Drawing Sheets

FIG. 16

| SPECULAR REFLECTION WIDTH [Deg] | GLOSSINESS |
|---|---|
| 0 | 100.00 |
| 0.1 | 91.17 |
| 0.2 | 78.26 |
| ⋮ | ⋮ |
| 3 | 27.82 |
| 3.1 | 27.21 |
| 3.2 | 26.62 |
| ⋮ | ⋮ |
| 13 | 0.49 |
| 13.1 | 0.35 |
| 13.2 | 0.20 |
| ⋮ | ⋮ |
| 89.8 | 0.00 |
| 89.9 | 0.00 |
| 90 | 0.00 |

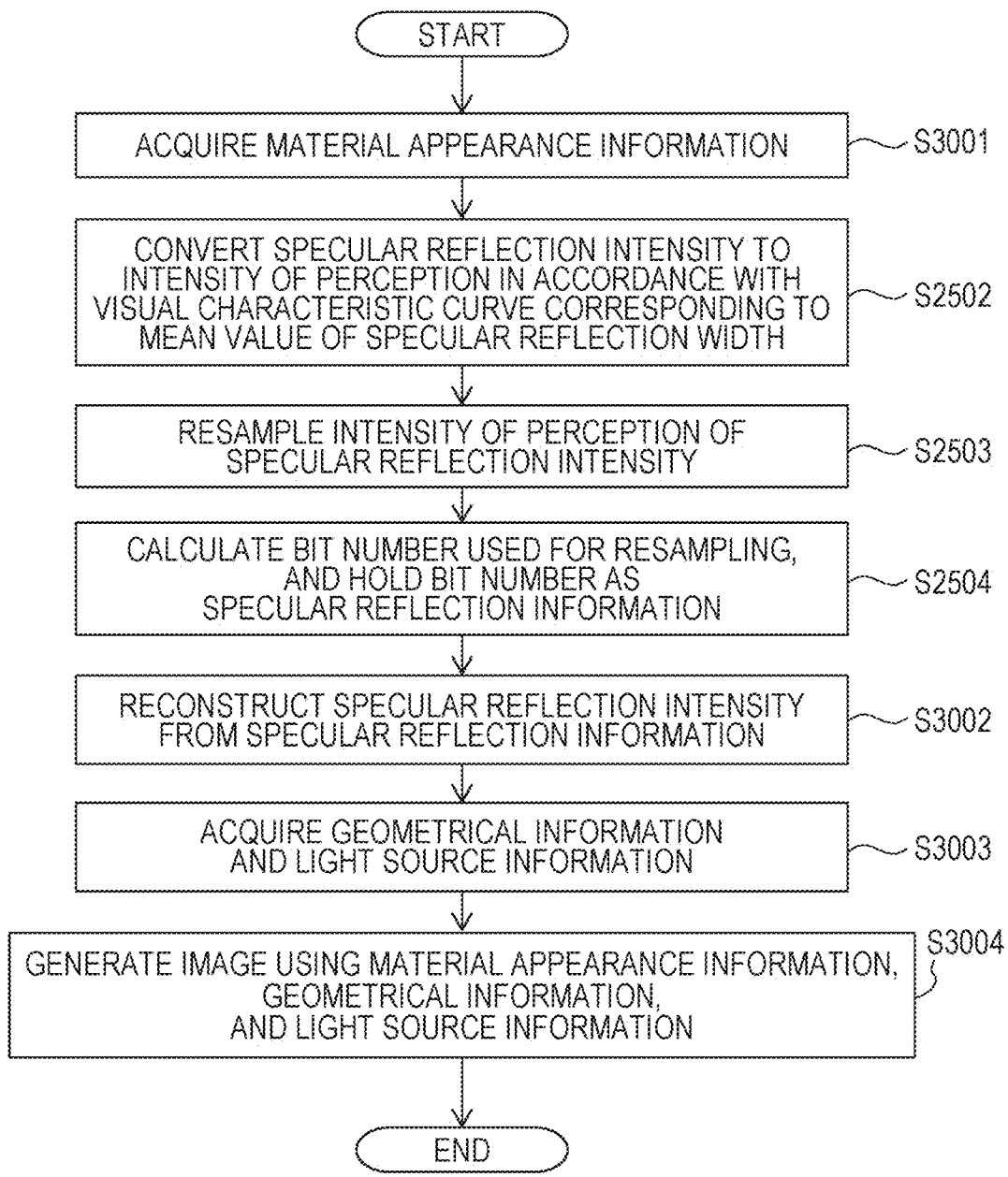

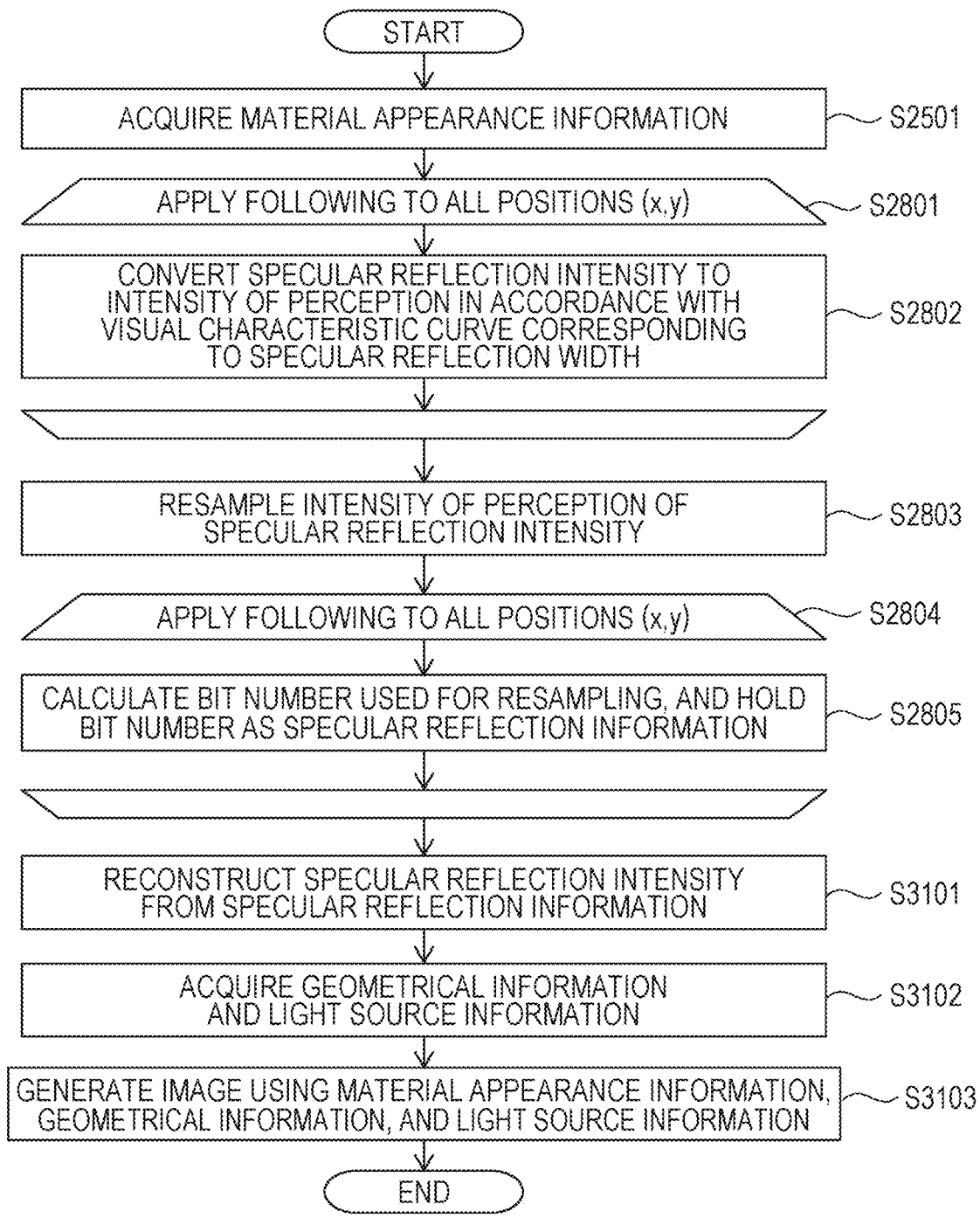

INFORMATION PROCESSING APPARATUS, INFORMATION PROCESSING METHOD, AND STORAGE MEDIUM

BACKGROUND

Field of the Disclosure

The present disclosure relates to a technology for representing the material appearance of a physical object.

Description of the Related Art

In recent years, with improvement in printing and CG technology, the material appearance representation of products is becoming possible. In material appearance representation, measured data of reflection characteristics that change depending on an illumination direction and a watching direction is used, and, generally, approximate data according to diffuse reflection information, specular reflection information, and surface asperity information is used.

Material appearance information on the material appearance of a product has a larger amount of data than representation with a still image, so a reduction in the amount of data is expected. Japanese Patent Laid-Open No. 2005-149390 describes a related art in a data compression technology for material appearance information.

In Japanese Patent Laid-Open No. 2005-149390, a subject image is decomposed into constituent elements with substantially the same feature quantities in accordance with the feature quantities of material appearance information data, and the material appearance information data is compressed by associating representative values of the feature quantities with the decomposed constituent elements. However, with the technology described in Japanese Patent Laid-Open No. 2005-149390, there are concerns about occurrence of artifact (occurrence of image quality degradation) in the case of material appearance that the appearance changes even when the feature quantities are similar depending on a way of selecting representative values.

SUMMARY

Some embodiments of the present disclosure are contemplated in view of such an inconvenience and provide a process for reducing the amount of data of material appearance information with suppressed image quality degradation at the time of material appearance reproduction.

An information processing apparatus according to an aspect of the present disclosure includes one or more memories and one or more processors. The one or more processors and the one or more memories are configured to acquire material appearance information including specular reflection information, convert the specular reflection information to an intensity of perception in accordance with visual characteristics for a gloss intensity, and resample the intensity of perception.

Further features of various embodiments will become apparent from the following description of exemplary embodiments with reference to the attached drawings.

BRIEF DESCRIPTION OF THE DRAWINGS

FIG. 16 is a look-up table that shows the visual characteristics of glossiness for specular reflection width.

FIG. 30 is a flowchart that shows an example of a process that is executed by the information processing apparatus and the image generating apparatus according to the eleventh embodiment.

FIG. 31 is a flowchart that shows an example of a process that is executed by an information processing apparatus and an image generating apparatus according to a twelfth embodiment.

DESCRIPTION OF THE EMBODIMENTS

Hereinafter, embodiments of the present disclosure will be described with reference to the attached drawings. The following embodiments are not always intended to limit every embodiment. Not all combinations of features that will be described in the following embodiments are indispensable for solutions of every embodiment. In the following embodiments of the present disclosure, like reference signs are assigned to the same components.

First Embodiment

Figure 1A:
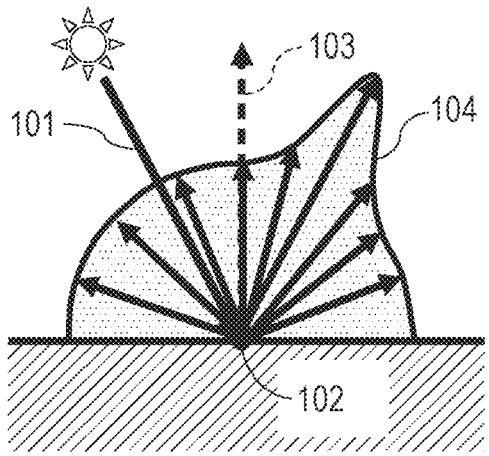
FIGS. 1A, 1B, and 1C are views for illustrating the reflection characteristics of a physical object.
Figure 1B:
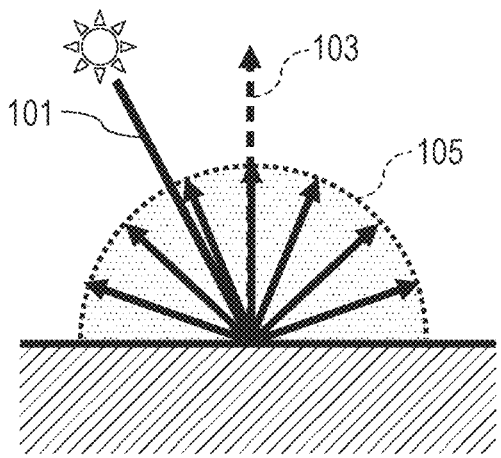
Figure 1C:
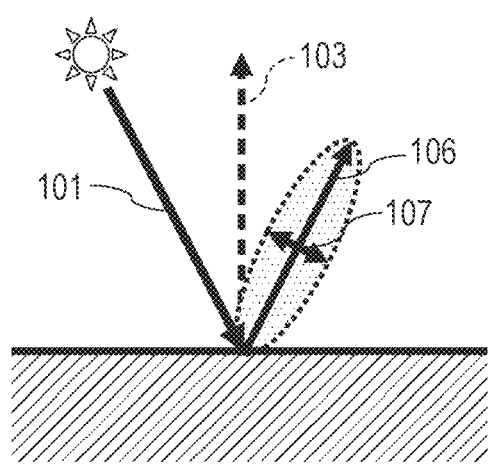
Figure 2A:
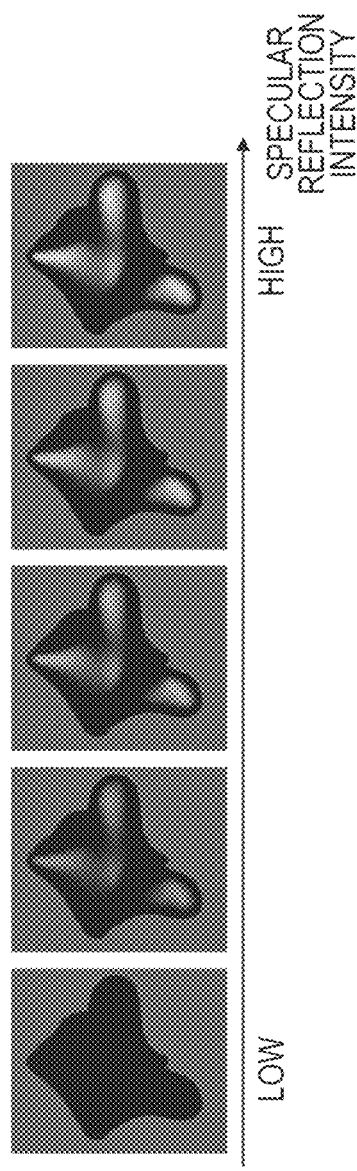
FIGS. 2A and 2B are views that show examples of changes in sensitivity to a specular reflection intensity according to a diffuse reflection intensity.
Figure 2B:
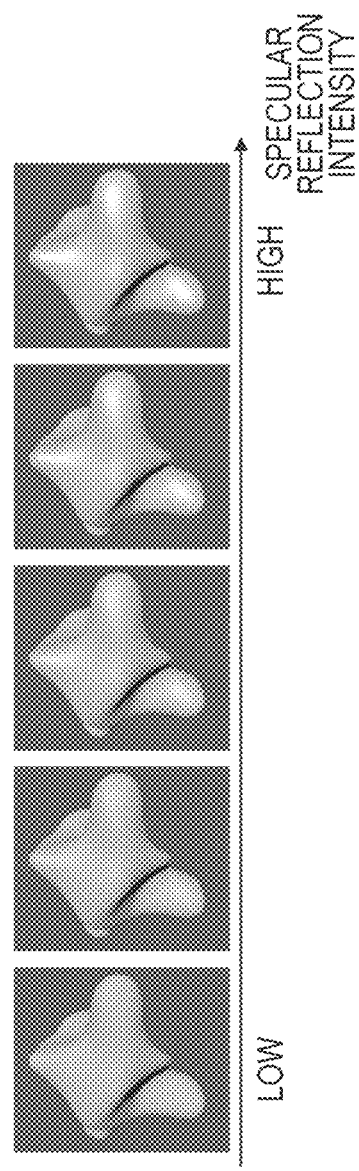

Initially, a first embodiment will be described.
Description of Reflection Characteristics Initially, the reflection characteristics of a physical object for representing material appearance will be described. FIGS. 1A, 1B, and 1C are views for illustrating the reflection characteristics of a physical object. Reflection characteristics represent angular distributive characteristics when light applied in one direction is reflected on a physical object surface. FIG. 1A shows a distribution 104 of reflected light at the time when light 101 from a light source enters toward a point 102 on a physical object surface having a normal line 103. Light having reflected on the physical object surface is separated into diffuse reflection shown in FIG. 1B and specular reflection shown in FIG. 1C. The diffuse reflection shown in FIG. 1B occurs as a result of irregular reflection of incident light 101 in a surface layer of the physical object and is observed with a uniform intensity regardless of an observation direction. The intensity is referred to as diffuse reflection intensity 105. On the other hand, the specular reflection shown in FIG. 1C occurs as a result of reflection of incident light 101 in a regular reflection direction on the physical object surface. A regular reflection direction is a direction in which the incident angle and reflection angle of light 101 are equal to each other with reference to the normal line 103. A reflection intensity in a direction in which the intensity of specular reflection is maximum is referred to as specular reflection intensity 106. As shown in FIG. 1C, specular reflection has spread to around a regular reflection direction depending on the microscopic shape of a physical object surface. The spread of the specular reflection is referred to as specular reflection width 107.
Visual Characteristics of Human to Material Appearance Next, the visual characteristics of a human, which is focused on in the present embodiment, will be described. In the present embodiment, the sensitivity of each of the diffuse reflection intensity 105 and the specular reflection intensity 106 to a gloss intensity perceived by a human is focused. Specifically, in the present embodiment, sensitivity to the specular reflection intensity 106, which changes with the diffuse reflection intensity 105, is focused. FIGS. 2A and 2B are views that show examples of changes in sensitivity to the specular reflection intensity 106 of FIG. 1C according to the diffuse reflection intensity 105 of FIG. 1B. FIG. 2A is an example of images at the time when the specular reflection intensity 106 of FIG. 1C is increased while the diffuse reflection intensity 105 of FIG. 1B is low.

FIG. 2B is an example of images at the time when the specular reflection intensity 106 of FIG. 1C is increased while the diffuse reflection intensity 105 of FIG. 1B is high. When the diffuse reflection intensity 105 is low as shown in FIG. 2A, a change in reflected light at the time when the specular reflection intensity 106 is increased is easily perceived as compared to when the diffuse reflection intensity 105 is high as shown in FIG. 2B. This occurs because an intensity change due to the specular reflection intensity 106 is predominant when the diffuse reflection intensity 105 is low with respect to a reflection intensity being observed, while the influence of an intensity change due to the specular reflection intensity 106 reduces when the diffuse reflection intensity 105 is high. In this way, sensitivity to the specular reflection intensity 106 changes with the ratio between the diffuse reflection intensity 105 and the specular reflection intensity 106 in reflected light being observed. There is an Lcd space that represents the intensity of perception perceived by a human for a reflection intensity from the relationship between the physical diffuse reflection intensity 105 and the physical specular reflection intensity 106.

In the Lcd space, a visual characteristic curve that represents visual sensitivity to a reflection intensity is expressed by a contrast gloss c shown in the following equation (1).

$$c = \sqrt[3]{\rho_s + \frac{\rho_d}{2}} - \sqrt[3]{\frac{\rho_d}{2}} \qquad (1)$$

In equation (1), ρd (0≤ρd≤1) is a diffuse reflection intensity 105. In equation (1), ρs (0≤ρs≤1) is a specular reflection intensity 106.

Figure 3:
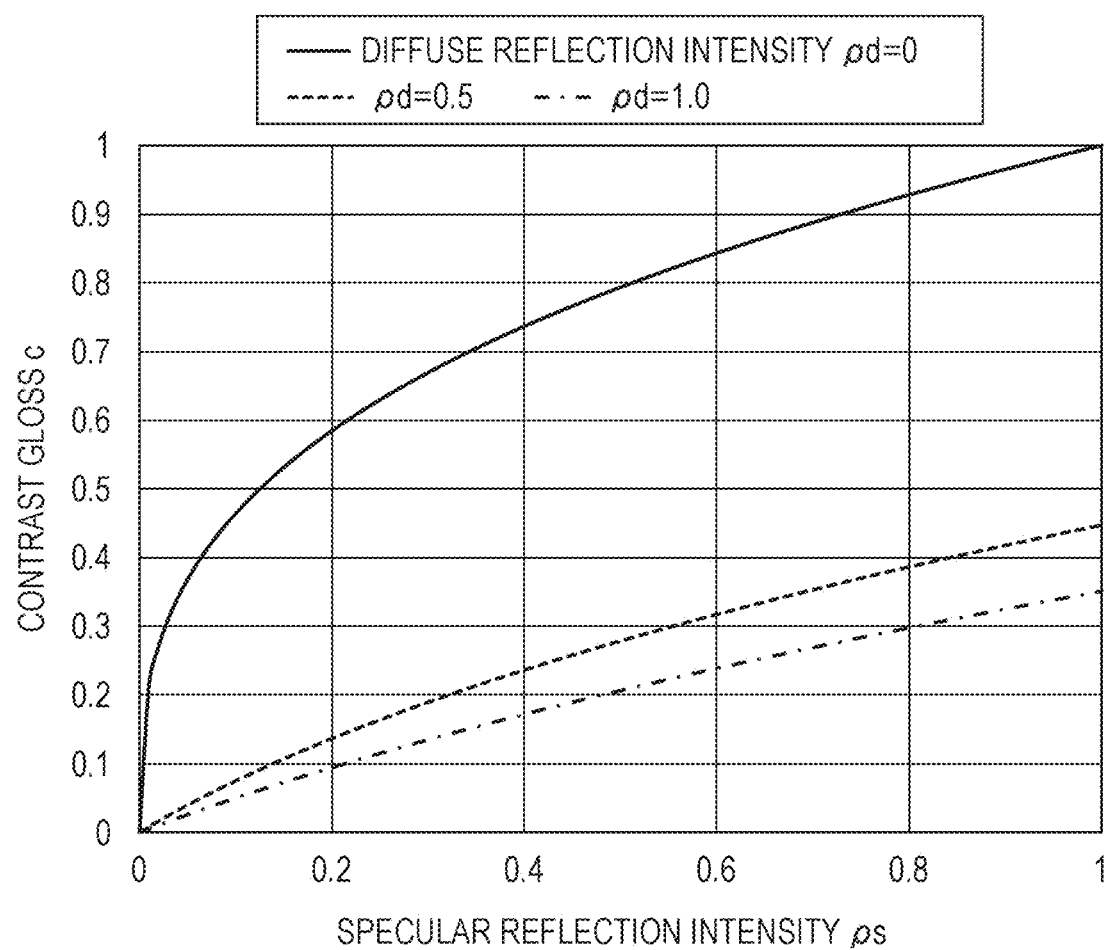
FIG. 3 is a graph that shows the visual sensitivity of a specular reflection intensity according to a diffuse reflection intensity.

FIG. 3 is a visual characteristic curve that shows the visual sensitivity of a specular reflection intensity ρs according to a diffuse reflection intensity ρd, created in accordance with the contrast gloss c expressed by equation (1). Specifically, FIG. 3 shows a value taken by the contrast gloss c according to the specular reflection intensity ρs when the diffuse reflection intensity ρd (0≤ρd≤1) is set to 0, 0.5, and 1.0. From FIG. 3, where the diffuse reflection intensity ρd=0, the contrast gloss c takes a range from zero to one with a change in specular reflection intensity ρs. On the other hand, where the diffuse reflection intensity ρd=1, the contrast gloss c takes a range 0 to around 0.35 for a change in specular reflection intensity ρs. In this way, human visual sensitivity to a reflection intensity changes according to the diffuse reflection intensity ρd. Particularly, as the diffuse reflection intensity ρd gets higher (increases), sensitivity to a reflection intensity (specular reflection intensity ρs) resulting from a change in specular reflection gets lower (reduces).

In the present embodiment, the amount of data of material appearance information is reduced by resampling the specular reflection intensity ρs with the intensity of perception in accordance with the above-described visual characteristics to the specular reflection intensity $\rho s$ according to the diffuse reflection intensity $\rho d$. At this time, as the diffuse reflection intensity $\rho d$ increases, a bit number (amount of data) used to represent the specular reflection intensity $\rho s$ can be reduced.

Specifically, in the present embodiment, an information processing apparatus that reduces the amount of data of material appearance information by resampling the specular reflection intensity $\rho s$ using a visual characteristic curve corresponding to the minimum value of the diffuse reflection intensity $\rho d$ will be described.

Hardware Components of Information Processing Apparatus 2

Figure 4:
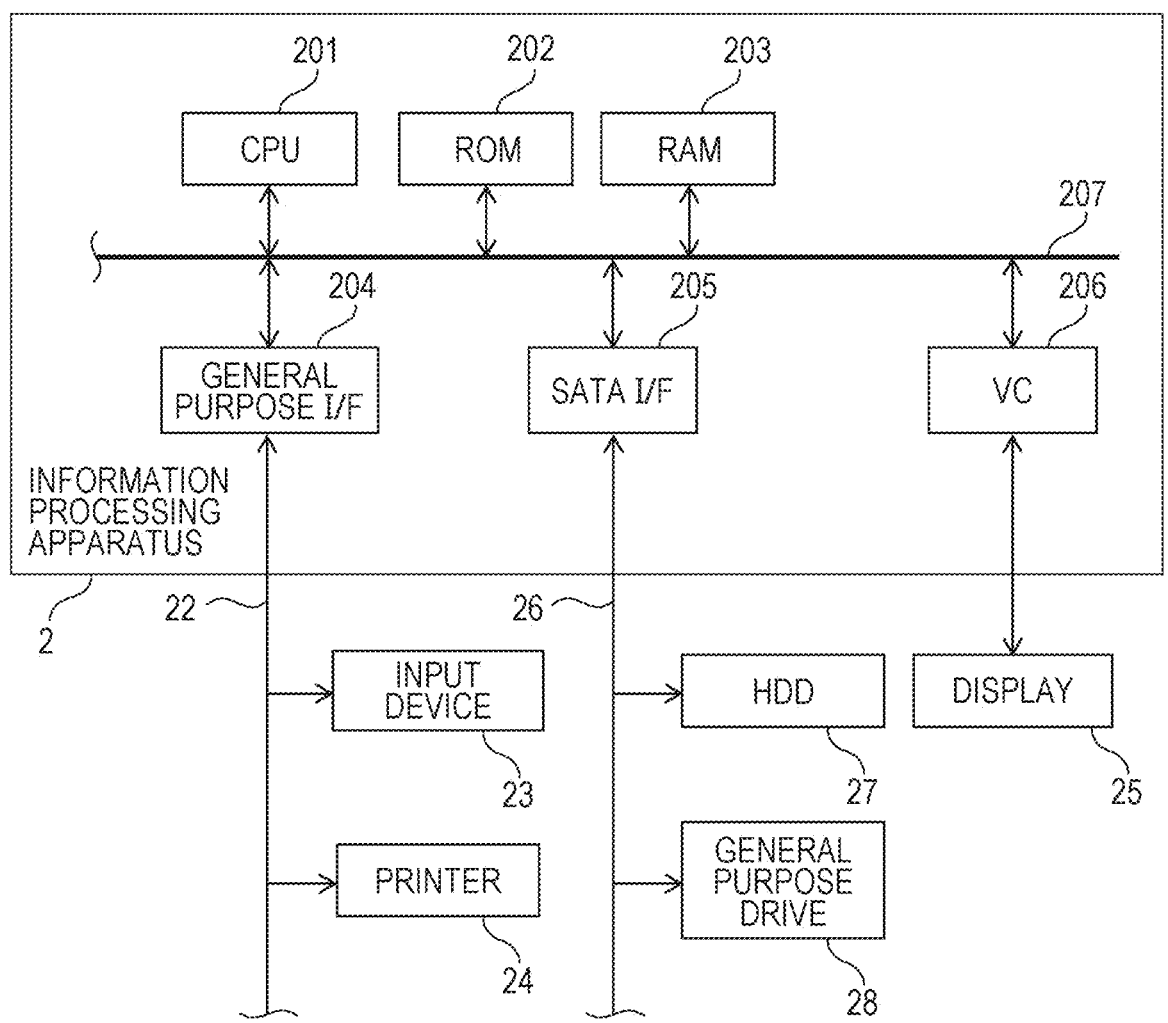
FIG. 4 is a diagram that shows an example of the hardware components of an information processing apparatus according to a first embodiment.

FIG. 4 is a diagram that shows an example of the hardware components of an information processing apparatus 2 according to a first embodiment. The information processing apparatus 2 is, for example, a computer. As shown in FIG. 4, the information processing apparatus 2 has hardware components including a CPU 201, a ROM 202, a RAM 203, a general purpose interface (I/F) 204, a serial ATA (SATA) I/F 205, and a video card (VC) 206.

The CPU 201 runs an operating system (OS) and various programs stored in the ROM 202, a hard disk drive (HDD) 27, or the like by using the RAM 203 as a work memory. The CPU 201 also controls the components via a system bus 207. A process according to a flowchart (described later) is, for example, executed in a manner such that computer-executable instructions stored in the ROM 202 (or the HDD 27) is loaded into the RAM 203 and run by the CPU 201.

An input device 23, such as a mouse and a keyboard, and a printer 24 are connected to the general purpose I/F 204 via a serial bus 22.

A general purpose drive 28 is connected to the SATA I/F 205. The general purpose drive 28 reads and writes the HDD 27 and various recording media via the serial bus 26. The CPU 201 uses the HDD 27 and various recording media mounted on the general purpose drive 28 as storage locations for various pieces of data.

A display 25 is connected to the VC 206. The CPU 201 displays a user interface (UI), provided by computer-executable instructions, on the display 25 and receives input information, indicating user's instructions, obtained via the input device 23.

Logical Components (Functional Components) of Information Processing Apparatus 2

Figure 5:
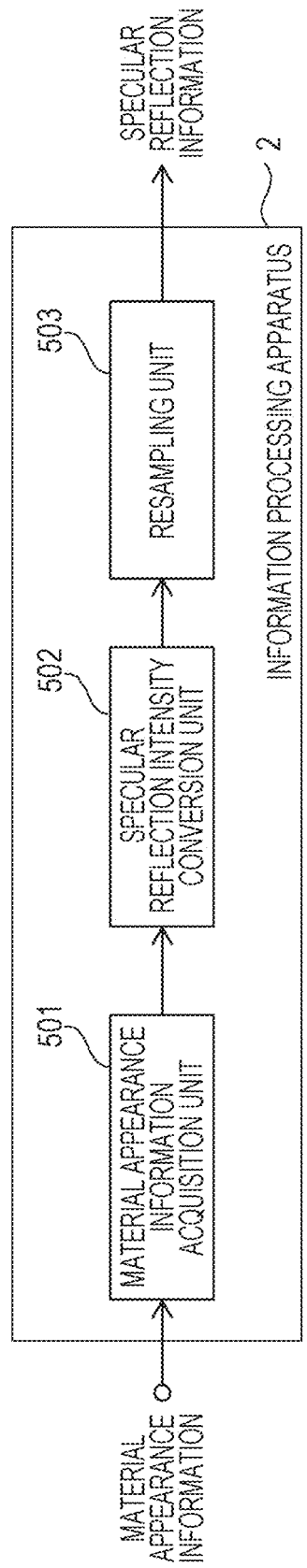
FIG. 5 is a diagram that shows an example of the logical components of the information processing apparatus according to the first embodiment.

FIG. 5 is a diagram that shows an example of the logical components of the information processing apparatus 2 according to the first embodiment. The information processing apparatus 2 according to the first embodiment functions as logical components 501 to 503 shown in FIG. 5 in a manner such that the CPU 201 shown in FIG. 4 executes computer-executable instructions stored in the ROM 202 using the RAM 203 as a work memory. The whole process described below does not need to be executed by the CPU 201; the information processing apparatus 2 may be configured such that part or whole of the process may be executed by one or multiple processing circuits, other than the CPU 201.

As shown in FIG. 5, the information processing apparatus 2 according to the first embodiment has logical components including a material appearance information acquisition unit 501, a specular reflection intensity conversion unit 502, and a resampling unit 503.

The material appearance information acquisition unit 501 acquires material appearance information including information indicating a diffuse reflection intensity $\rho d(x,y)$ and information indicating a specular reflection intensity $\rho s(x,y)$. Here, the information indicating the diffuse reflection intensity $\rho d(x,y)$ is information that belongs to diffuse reflection information, and the information indicating the specular reflection intensity $\rho s(x,y)$ is information that belongs to specular reflection information.

The specular reflection intensity conversion unit 502 converts the specular reflection intensity $\rho s(x,y)$ to a specular reflection perception intensity $\rho c(x,y)$ in accordance with visual characteristics (visual characteristic curve) for a gloss intensity, corresponding to a minimum value of the diffuse reflection intensity $\rho d(x,y)$.

The resampling unit 503 resamples the specular reflection perception intensity $\rho c(x,y)$ converted by the specular reflection intensity conversion unit 502 to create specular reflection information $\rho s_{comp}(x,y)$ with a reduced amount of data used.

Process that is Executed by Information Processing Apparatus 2

Figure 6:
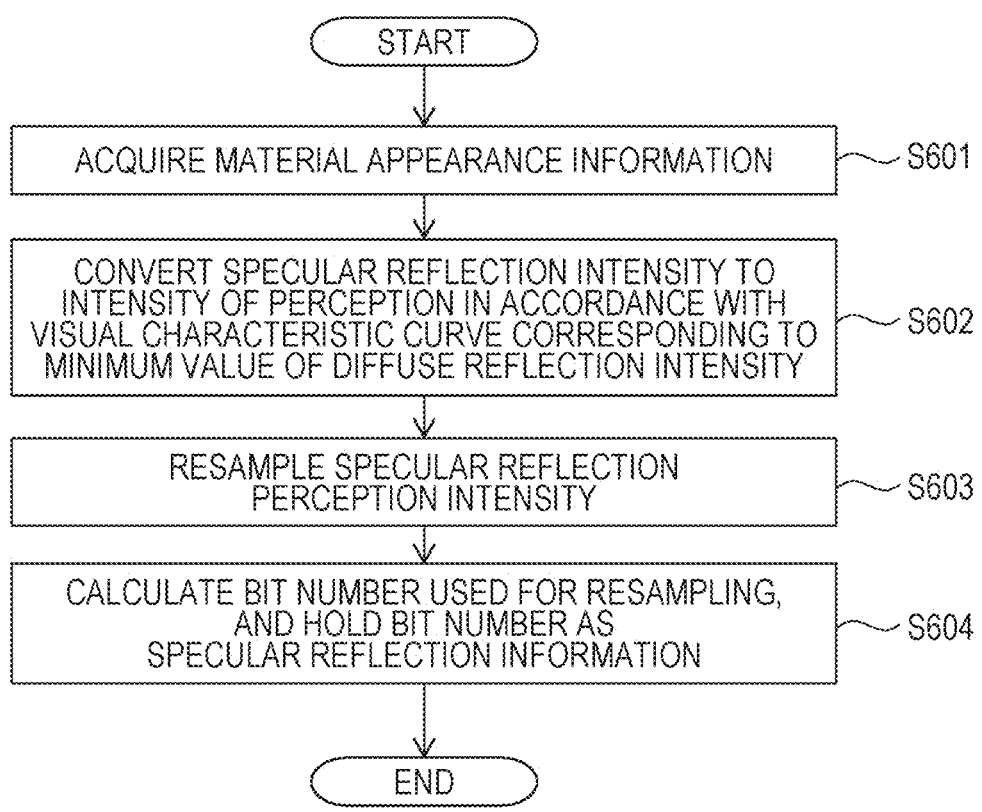
FIG. 6 is a flowchart that shows an example of a process that is executed by the information processing apparatus according to the first embodiment.

FIG. 6 is a flowchart that shows an example of a procedure of an information processing method that is executed by the information processing apparatus 2 according to the first embodiment. The process of the flowchart shown in FIG. 6 is started when the information processing apparatus 2 receives instructions from a user via the input device 23 for a process of reducing the amount of data of material appearance information. Hereinafter, in the flowchart shown in FIG. 6, "S" is prefixed to the reference sign in each step.

In S601, the material appearance information acquisition unit 501 acquires material appearance information including information indicating a diffuse reflection intensity $\rho d(x,y)$ and information indicating a specular reflection intensity $\rho s(x,y)$ from the data storage locations in accordance with the instructions from the user.

Figure 7:
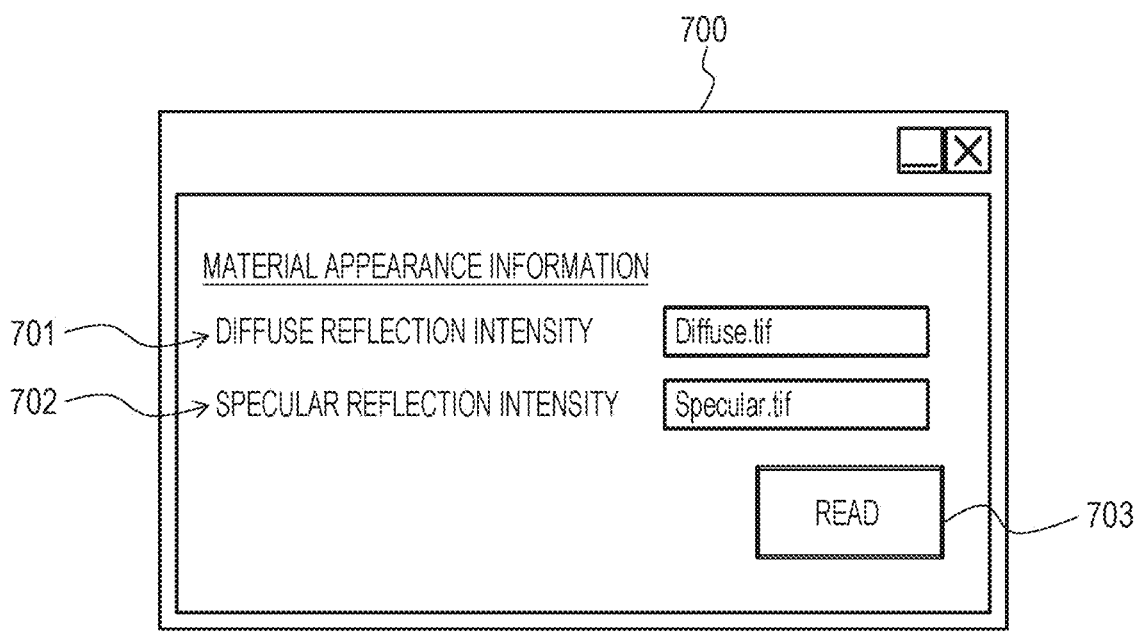
FIG. 7 is a view that shows an example of a UI screen.

FIG. 7 is a view that shows an example of a UI screen 700 for acquiring material appearance information in S601 of FIG. 6. The material appearance information acquisition unit 501 sets the storage location of data (information) designated by the user for the diffuse reflection intensity $\rho d(x,y)$ indicated by the reference sign 701 in FIG. 7 and sets the storage location of data (information) designated by the user for the specular reflection intensity $\rho s(x,y)$ indicated by the reference sign 702 in FIG. 7. In response to pressing down of a read button 703 shown in FIG. 7, the material appearance information acquisition unit 501 acquires information indicating the diffuse reflection intensity $\rho d(x,y)$ and information indicating the specular reflection intensity $\rho s(x,y)$ from the storage locations. In the present embodiment, the HDD 27 is assumed as a data storage location. Also, another device connected to the information processing apparatus 2 may be a data storage location, or the information processing apparatus 2 may have a data storage unit inside. In the present embodiment, information indicating the diffuse reflection intensity $\rho d(x,y)$ and information indicating the specular reflection intensity $\rho s(x,y)$ are expressed in an 8-bit gray scale image format, and a range of 0 to 1 as a value of each reflection intensity is associated with a range of 0 to 255 in pixel value.

Here, a further description of FIG. 6 will be made.

Subsequently, in S602, the specular reflection intensity conversion unit 502 converts the specular reflection intensity $\rho s(x,y)$ acquired in S601 to a specular reflection perception intensity $\rho c(x,y)$ in accordance with the visual characteristic curve corresponding to the minimum value of the diffuse reflection intensity $\rho d(x,y)$ acquired in S601. The details of S602 will be described below.

Initially, the specular reflection intensity conversion unit 502 acquires a minimum value $\rho d_{min}$ of the diffuse reflection intensity $\rho d(x,y)$ according to the following equation (2).

$$\rho_{d_{min}} = \min_{x,y} \rho_d(x, y) \qquad (2)$$

Subsequently, the specular reflection intensity conversion unit 502 converts the specular reflection intensity $\rho s(x,y)$ to the specular reflection perception intensity $\rho c(x,y)$ by using the visual characteristic curve corresponding to the minimum value $\rho d_{min}$ of the diffuse reflection intensity $\rho d(x,y)$. In the present embodiment, the contrast gloss c in the Lcd space is used for the visual characteristic curve. Specifically, the specular reflection intensity conversion unit 502 calculates the specular reflection perception intensity $\rho c(x,y)$ by converting the specular reflection intensity $\rho s(x,y)$ using the following equation (3).

$$\rho_c(x, y) = \sqrt[3]{\rho_{s(x,y)} + \frac{\rho_{d_{min}}}{2}} - \sqrt[3]{\frac{\rho_{d_{min}}}{2}} \qquad (3)$$

Subsequently, in S603, the resampling unit 503 resamples the specular reflection perception intensity $\rho c(x,y)$ converted in S602. Specifically, the resampling unit 503 sets a sampling width d of the specular reflection perception intensity $\rho c(x,y)$ and calculates a resampled specular reflection perception intensity $\rho c_{re}(x,y)$ according to the following equation (4).

$$\rho_{c_{re}}(x, y) = \text{floor}\left(\frac{\rho_c(x, y)}{d}\right) \qquad (4)$$

In equation (4), floor( ) is a function that rounds down to the nearest whole number. In equation (4), the sampling width d is set in accordance with, for example, a differential threshold of the contrast gloss c. The sampling width d may be separately designated by the user. In the present embodiment, the sampling width d is set to 0.01.

Subsequently, in S604, the resampling unit 503 calculates a bit number used to represent the values of the resampled specular reflection perception intensity $\rho c_{re}(x,y)$ calculated in S603 and holds specular reflection information $\rho s_{comp}(x, y)$ in accordance with the bit number. The details of S604 will be described below.

Initially, the resampling unit 503 calculates a specular reflection perception intensity $\rho' c_{re}$, obtained by resampling the maximum value of the contrast gloss c where the diffuse reflection intensity $\rho d(x,y)$ is a minimum value $\rho d_{min}$ using the following equation (5).

$$\rho'_{c_{re}} = \text{floor}\left(\frac{\left(\sqrt[3]{1 + \frac{\rho_{d_{min}}}{2}} - \sqrt[3]{\frac{\rho_{d_{min}}}{2}}\right)}{d}\right) \qquad (5)$$

In equation (5), $\rho' c_{re}$ is a maximum value that the resampled specular reflection perception intensity $\rho c_{re}(x,y)$ can take. With a bit number used to the representation, it is possible to represent the value of the resampled specular reflection perception intensity $\rho s_{re}(x,y)$ with the minimum number of bits. The resampling unit 503 also calculates a resampling bit number b used to represent a resampled specular reflection perception intensity according to the following equation (6).

$$b = \text{ceil}(\log_2 \rho'_{c_{re}}) \qquad (6)$$

In equation (6), ceil( ) is a function that rounds up to the nearest whole number. Subsequently, the resampling unit 503 sets specular reflection information $\rho s_{comp}(x,y)$ in accordance with the resampling bit number b used to represent the values of the resampled specular reflection perception intensity $\rho' c_{re}(x,y)$. Specifically, the resampling unit 503 holds binary specular reflection information $\rho s_{comp}(x,y)$ in which values at positions of the resampled specular reflection perception intensity $\rho' c_{re}(x,y)$ are listed in units of the resampling bit number b.

When the process of S604 ends, the process of the flowchart shown in FIG. 6 ends.

Advantageous Effects of First Embodiment

In the information processing apparatus 2 according to the first embodiment, the specular reflection intensity $\rho s(x,y)$ is converted to the specular reflection perception intensity $\rho c(x,y)$ in accordance with the visual characteristics (visual characteristic curve) corresponding to the minimum value of the diffuse reflection intensity $\rho d(x,y)$. In the information processing apparatus 2 according to the first embodiment, the amount of data of material appearance information is reduced by resampling the converted specular reflection perception intensity $\rho c(x,y)$. With resampling in accordance with the above-described human visual characteristics (visual characteristic curve), it is possible to reduce the amount of data of material appearance information with less image quality degradation at the time of material appearance reproduction.

In the present embodiment, even when the minimum value of the diffuse reflection intensity $\rho d(x,y)$ is zero, the resampling bit number is seven, so a reduction in the amount of data by about 13% is possible.

Second Embodiment

Next, a second embodiment will be described. In the following description of the second embodiment, the description of the same matter as that of the above-described first embodiment is omitted, and a matter different from that of the above-described first embodiment will be mainly described.

In the first embodiment, the specular reflection intensity $\rho s(x,y)$ is resampled uniformly over an entire image by using visual characteristics (visual characteristic curve) corresponding to the minimum value of the diffuse reflection intensity $\rho d(x,y)$. Also, a different visual characteristic curve may be used depending on a position. Therefore, in the second embodiment, an information processing apparatus that resamples the specular reflection intensity $\rho s(x,y)$ by using visual characteristics (visual characteristic curve) according to the diffuse reflection intensity $\rho d(x,y)$ at each position will be described.

The hardware components of the information processing apparatus 2 according to the second embodiment are similar to the hardware components of the information processing apparatus 2 according to the first embodiment, shown in FIG. 4. The logical components of the information processing apparatus 2 according to the second embodiment are also similar to the logical components of the information processing apparatus 2 according to the first embodiment, shown in FIG. 5.

Here, the logical components of the information processing apparatus 2 according to the second embodiment will be described with reference to FIG. 5. The material appearance information acquisition unit 501, as in the case of the first embodiment, acquires material appearance information including information indicating a diffuse reflection intensity $\rho d(x,y)$ and information indicating a specular reflection intensity $\rho s(x,y)$.

The specular reflection intensity conversion unit 502 converts the specular reflection intensity $\rho s(x,y)$ to a specular reflection perception intensity $\rho c(x,y)$ in accordance with visual characteristics (visual characteristic curve) corresponding to the diffuse reflection intensity $\rho d(x,y)$ at each position $(x,y)$. The resampling unit 503 resamples the specular reflection perception intensity $\rho c(x,y)$ converted by the specular reflection intensity conversion unit 502 to create specular reflection information $\rho s_{comp}(x,y)$ with a reduced amount of data used.

Process that is Executed by Information Processing Apparatus 2

Figure 8:
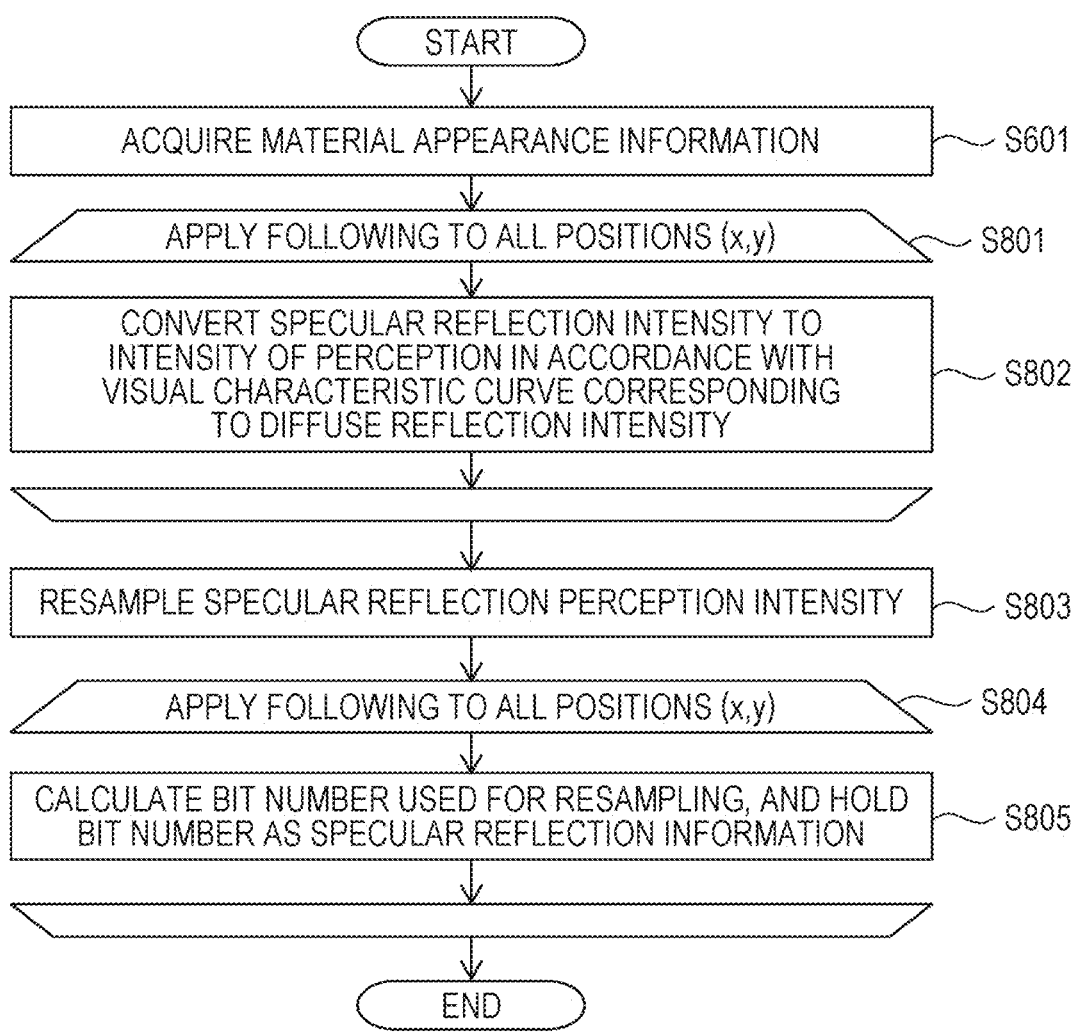
FIG. 8 is a flowchart that shows an example of a process that is executed by an information processing apparatus according to a second embodiment.

FIG. 8 is a flowchart that shows an example of a procedure of an information processing method that is executed by the information processing apparatus 2 according to the second embodiment. In FIG. 8, like step numbers are assigned to steps similar to the steps shown in FIG. 6.

In S601, the material appearance information acquisition unit 501, as in the case of the first embodiment, acquires material appearance information including information indicating a diffuse reflection intensity $\rho d(x,y)$ and information indicating a specular reflection intensity $\rho s(x,y)$ from the data storage locations in accordance with instructions from the user.

Subsequently, in S801, the specular reflection intensity conversion unit 502 executes S802 for all the positions $(x,y)$ that are the entire region.

Subsequently, in S802, the specular reflection intensity conversion unit 502 converts the specular reflection intensity $\rho s(x,y)$ acquired in S601 to a specular reflection perception intensity $\rho c(x,y)$ in accordance with the visual characteristic curve corresponding to the diffuse reflection intensity $\rho d(x,y)$ acquired in S601. Here, as in the case of the first embodiment, the specular reflection intensity conversion unit 502 calculates the specular reflection perception intensity $\rho c(x,y)$ by converting the specular reflection intensity $\rho s(x,y)$ using the following equation (7) with the use of the contrast gloss c in the Lcd space for the visual characteristic curve.

$$\rho_c(x, y) = \sqrt[3]{\rho_{s(x,y)} + \frac{\rho_d(x, y)}{2}} - \sqrt[3]{\frac{\rho_d(x, y)}{2}} \quad (7)$$

Subsequently, in S803, the resampling unit 503 resamples the specular reflection perception intensity $\rho c(x,y)$ converted through S801 and S802. The detailed process of S803 is similar to S603 in the first embodiment, so the description thereof is omitted.

Subsequently, in S804, the resampling unit 503 executes S805 over all the positions $(x,y)$ that are the entire region.

In S805, the resampling unit 503 calculates a bit number used to represent the values of the resampled specular reflection perception intensity $\rho c_{re}(x,y)$ calculated in S803 and holds specular reflection information $\rho s_{comp}(x,y)$ in accordance with the bit number. The details of S805 will be described below.

Initially, the resampling unit 503 calculates a specular reflection perception intensity $\rho'c_{re}(\rho d(x,y))$, obtained by resampling the maximum value of the contrast gloss c for the diffuse reflection intensity $\rho d(x,y)$ according to the following equation (8).

$$\rho'_{c_{re}}(\rho_d(x, y)) = \text{floor}\left(\frac{\left(\sqrt[3]{1 + \frac{\rho_d(x, y)}{2}} - \sqrt[3]{\frac{\rho_d(x, y)}{2}}\right)}{d}\right) \quad (8)$$

In equation (8), $\rho'c_{re}(\rho d(x,y))$ is a maximum value that the resampled specular reflection perception intensity $\rho c_{re}(x,y)$ for the diffuse reflection intensity $\rho d(x,y)$ can take. With a bit number used to the representation, it is possible to represent the value of the resampled specular reflection perception intensity $\rho c_{re}(x,y)$ with the minimum number of bits. Initially, the resampling unit 503 calculates a resampling bit number $b(\rho d(x,y))$ used for the resampled specular reflection perception intensity $\rho c_{re}(x,y)$ for the diffuse reflection intensity $\rho d(x,y)$ according to the following equation (9).

$$b(\rho_d(x,y)) = \text{ceil}(\log_2 \rho'_{c_{re}}(\rho_d(x,y))) \quad (9)$$

Subsequently, the resampling unit 503 sets the resampling bit number used to represent the values of the resampled specular reflection perception intensity $\rho'c_{re}(x,y)$ to $b(\rho d(x,y))$. Specifically, the resampling unit 503 holds binary specular reflection information $\rho s_{comp}(x,y)$ in which values of the resampled specular reflection perception intensity $\rho'c_{re}(x,y)$ are listed by using the resampling bit number $b(\rho d(x,y))$.

When the process of S804 and S805 ends, the process of the flowchart shown in FIG. 8 ends.

Advantageous Effects of Second Embodiment

In the information processing apparatus 2 according to the second embodiment, the specular reflection intensity $\rho s(x,y)$ is converted to the specular reflection perception intensity $\rho c(x,y)$ in accordance with the visual characteristics (visual characteristic curve) corresponding to the diffuse reflection intensity $\rho d(x,y)$ at each position $(x,y)$. In the information processing apparatus 2 according to the second embodiment, the amount of data of material appearance information is reduced by resampling the converted specular reflection perception intensity $\rho c(x,y)$. In the second embodiment, a further larger amount of data is reduced by independently determining a bit number used for each pixel (set an independent bit number for each position) according to a diffuse reflection intensity as compared to the first embodiment in which the same bit number is set over the entire region.

Third Embodiment

Next, a third embodiment will be described. In the following description of the third embodiment, the description of the same matter as that of the above-described first and second embodiments is omitted, and a matter different from that of the above-described first and second embodiments will be mainly described.

In the first embodiment and the second embodiment, the information processing apparatus that reduces the amount of data of information indicating a specular reflection intensity $\rho s(x,y)$ in accordance with visual characteristics (visual characteristic curve) has been described. In the third embodiment, a system that includes an information processing apparatus and an image generating apparatus that reconstructs information indicating an original specular reflection intensity from information indicating a specular reflection intensity reduced in the amount of data by the information processing apparatus and that generates an image when light source information and geometrical information are given from the user will be described.

Logical Components (Functional Components) of Information Processing Apparatus 2 and Image Generating Apparatus 3

Figure 9:
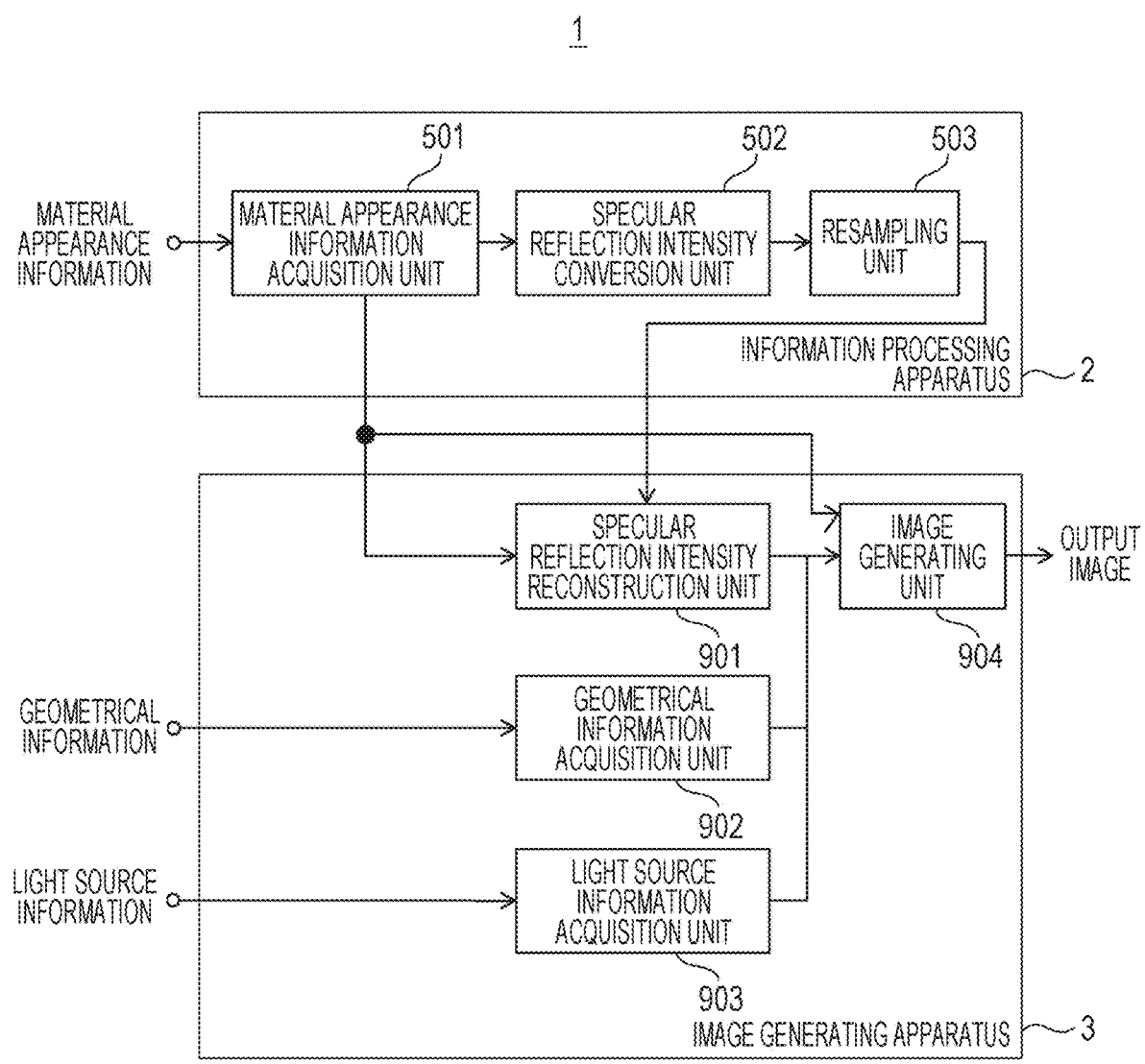
FIG. 9 is a diagram that shows an example of the logical components of an information processing apparatus and an image generating apparatus according to a third embodiment.

FIG. 9 is a diagram that shows an example of the logical components of an information processing apparatus 2 and an image generating apparatus 3 according to the third embodiment. Here, FIG. 9 shows an information processing system 1 configured to include the information processing apparatus 2 and the image generating apparatus 3. In FIG. 9, like reference signs denote components similar to the components shown in FIG. 5, and the detailed description thereof is omitted.

The information processing apparatus 2 according to the third embodiment, shown in FIG. 9, has similar components to the logical components of the information processing apparatus 2 according to the first embodiment, shown in FIG. 5. In other words, as shown in FIG. 9, the information processing apparatus 2 according to the third embodiment has logical components including the material appearance information acquisition unit 501, the specular reflection intensity conversion unit 502, and the resampling unit 503. The information processing apparatus 2 according to the third embodiment has similar components to the hardware components of the information processing apparatus 2 according to the first embodiment, shown in FIG. 4. At this time, the information processing apparatus 2 according to the third embodiment functions as logical components 501 to 503 shown in FIG. 9 in a manner such that the CPU 201 shown in FIG. 4 executes computer-executable instructions stored in the ROM 202 using the RAM 203 as a work memory.

As shown in FIG. 9, the image generating apparatus 3 according to the third embodiment has logical components including a specular reflection intensity reconstruction unit 901, a geometrical information acquisition unit 902, a light source information acquisition unit 903, and an image generating unit 904. The image generating apparatus 3 according to the third embodiment, as in the case of, for example, the hardware components of the information processing apparatus 2 according to the first embodiment, shown in FIG. 4, has hardware components including a CPU, a ROM, a RAM, a general purpose I/F, a SATA I/F, and a VC. At this time, the image generating apparatus 3 according to the third embodiment functions as logical components 901 to 904 shown in FIG. 9 in a manner such that the CPU executes computer-executable instructions stored in the ROM using the RAM as a work memory.

Hereinafter, the logical components 501 to 503 of the information processing apparatus 2 according to the third embodiment, shown in FIG. 9, and the logical components 901 to 904 of the image generating apparatus 3 according to the third embodiment, shown in FIG. 9, will be described.

Initially, the logical components of the information processing apparatus 2 according to the third embodiment, shown in FIG. 9, will be described.

The material appearance information acquisition unit 501 acquires material appearance information including information indicating a diffuse reflection intensity $\rho d(x,y)$, information indicating a specular reflection intensity $\rho s(x,y)$, information indicating a specular reflection width $\sigma l(x,y)$, and information indicating a normal line $N(x,y)$. Here, the information indicating a specular reflection width $\sigma l(x,y)$ is information indicating the spread of specular reflection.

The specular reflection intensity conversion unit 502, as in the case of the first embodiment, converts the specular reflection intensity $\rho s(x,y)$ to a specular reflection perception intensity $\rho c(x,y)$ in accordance with visual characteristics (visual characteristic curve) for a gloss intensity, corresponding to a minimum value of the diffuse reflection intensity $\rho d(x,y)$.

The resampling unit 503, as in the case of the first embodiment, resamples the specular reflection perception intensity $\rho c(x,y)$ converted by the specular reflection intensity conversion unit 502 to create specular reflection information $\rho s_{comp}(x,y)$ with a reduced amount of data used.

Next, the logical components of the image generating apparatus 3 according to the third embodiment, shown in FIG. 9, will be described.

The specular reflection intensity reconstruction unit 901 reconstructs (decodes) information indicating a specular reflection intensity expressed by an original physical quantity from the specular reflection information $\rho s_{comp}(x,y)$ reduced in the amount of data, by using the visual characteristic curve corresponding to the minimum value $\rho d_{min}$ of the diffuse reflection intensity $\rho d(x,y)$.

The geometrical information acquisition unit 902 acquires geometrical information including information indicating a view vector $V=(Vx,Vy,Vz)$.

The light source information acquisition unit 903 acquires light source information including information indicating a light source vector $L=(Lx,Ly,Lz)$ and information indicating a light source intensity E.

The image generating unit 904 generates an image by using the information indicating the specular reflection intensity $\rho s(x,y)$ reconstructed by the specular reflection intensity reconstruction unit 901, the material appearance information, the geometrical information, and the light source information. Here, the material appearance information includes the information indicating the diffuse reflection intensity $\rho d(x,y)$, the information indicating the specular reflection width $\sigma l(x,y)$, and the information indicating the normal line $N(x,y)$. The geometrical information includes the information indicating the view vector V. The light source information includes the information indicating the light source vector L and the information indicating the light source intensity E.

In the information processing system 1 shown in FIG. 9, a mode in which the specular reflection intensity reconstruction unit 901 is configured in the image generating apparatus 3 is shown; however, some embodiments of the present disclosure are not limited to this mode. The present disclosure encompasses, for example, a mode in which the specular reflection intensity reconstruction unit 901 that reconstructs specular reflection information from information obtained by resampling a specular reflection perception intensity $\rho c(x,y)$ in the resampling unit 503 is configured in the information processing apparatus 2.

Process that is Executed by Information Processing Apparatus 2 and Image Generating Apparatus 3

Figure 10:
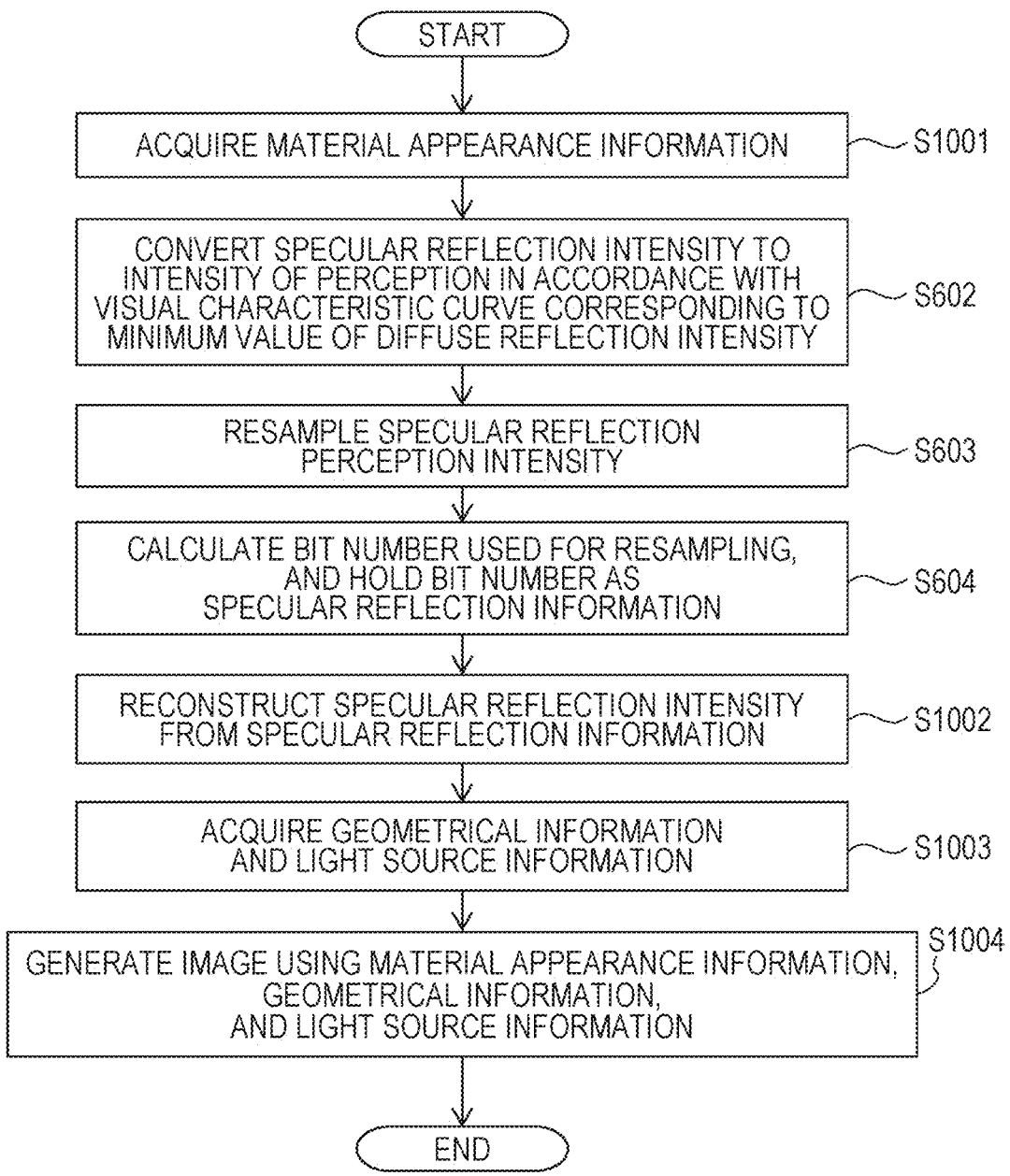
FIG. 10 is a flowchart that shows an example of a process that is executed by the information processing apparatus and the image generating apparatus according to the third embodiment.

FIG. 10 is a flowchart that shows an example of a procedure of an information processing method that is executed by the information processing apparatus 2 and the image generating apparatus 3 according to the third embodiment. In FIG. 10, like step numbers are assigned to steps similar to the steps shown in FIG. 6.

In S1001, the material appearance information acquisition unit 501 acquires material appearance information from the data storage locations in accordance with instructions from the user. Specifically, in S1001, the material appearance information acquisition unit 501 acquires material appearance information including information indicating a diffuse reflection intensity ρd(x,y), information indicating a specular reflection intensity ρs(x,y), information indicating a specular reflection width σl(x,y), and information indicating a normal line N(x,y).

Figure 11:
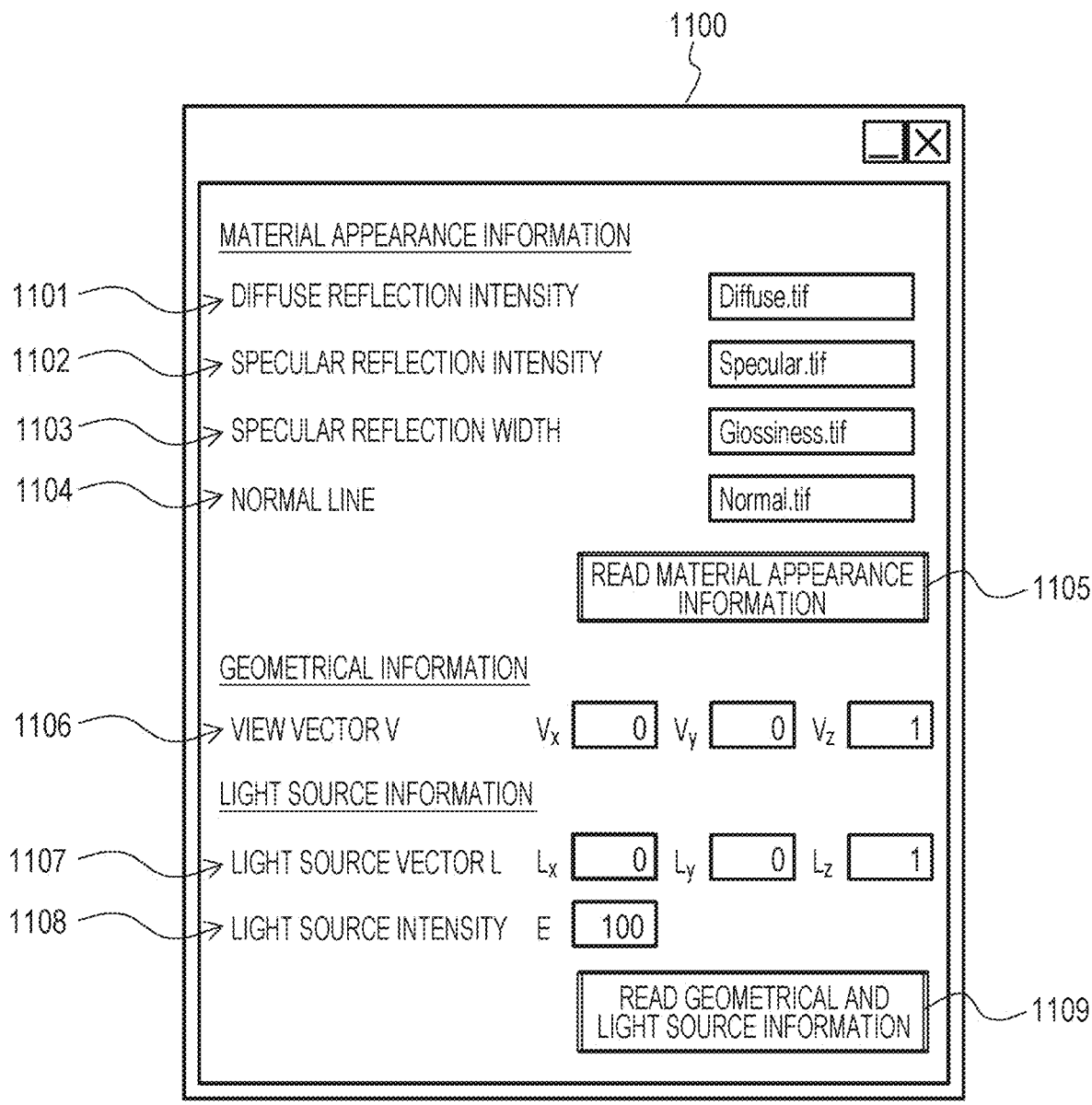
FIG. 11 is a view that shows an example of a UI screen.

FIG. 11 is a view that shows an example of a UI screen 1100 for acquiring material appearance information in S1001 of FIG. 10 and acquiring geometrical information and light source information in S1003 of FIG. 10. The material appearance information acquisition unit 501 sets the storage location of data (information) designated by the user for each of the diffuse reflection intensity ρd(x,y) indicated by the reference sign 1101 in FIG. 11, the specular reflection intensity ρs(x,y) indicated by the reference sign 1102 in FIG. 11, the specular reflection width σl(x,y) indicated by the reference sign 1103 in FIG. 11, and the normal line N(x,y) indicated by the reference sign 1104 in FIG. 11.

In response to pressing down of a material appearance information read button 1105 shown in FIG. 11, the material appearance information acquisition unit 501 acquires the information indicating the diffuse reflection intensity ρd(x,y), the information indicating the specular reflection intensity ρs(x,y), the information indicating the specular reflection width σl(x,y), and the information indicating the normal line N(x,y) from the storage location. In the present embodiment, the information indicating the diffuse reflection intensity ρd(x,y), the information indicating the specular reflection intensity ρs(x,y), and the information indicating the specular reflection width σl(x,y) are expressed in an 8-bit gray scale image format, and a range of 0 to 1 as a value of each intensity is associated with a range of 0 to 255 in pixel value. In the present embodiment, the information indicating the normal line N(x,y) is expressed in an 8-bit RGB image format. At this time, an x component (in the range of −1 to 1) of a normal line is associated with an R component (in the range of 0 to 255) of an image. A y component (in the range of −1 to 1) of the normal line is associated with a G component (in the range of 0 to 255) of the image. A z component (in the range of −1 to 1) of the normal line is associated with a B component (in the range of 0 to 255) of the image.

Here, a further description of FIG. 10 will be made.

Subsequently, S602, S603, and S604 are similar to the process in the first embodiment, shown in FIG. 6, so the description thereof is omitted. Through the process of S602 to S604, the specular reflection information $\rho s_{comp}(x,y)$ reduced in the amount of data used is created.

Subsequently, in S1002, the specular reflection intensity reconstruction unit 901 reconstructs a specular reflection intensity ρx's(x,y) as a physical quantity from the specular reflection information $\rho s_{comp}(x,y)$. Specifically, initially, the specular reflection intensity reconstruction unit 901 reads data in units of resampling bit number b from the specular reflection information $\rho s_{comp}(x,y)$ and obtains a specular reflection perception intensity ρ'c(x,y) before resampling by using the sampling width d according to the following equation (10).

$$\rho'_c(x,y)=d\rho_{s_{comp}}(x,y) \quad (10)$$

Subsequently, the specular reflection intensity reconstruction unit 901 reconstructs a specular reflection intensity ρ's(x,y) in a physical quantity expressed by the following equation (11) from the specular reflection perception intensity ρ'c(x,y) in accordance with the visual characteristic curve.

$$\rho'_s(x,y) = \left(\rho'_c(x,y) + \sqrt[3]{\frac{\rho_{d_{min}}}{2}}\right)^3 - \frac{\rho_{d_{min}}}{2} \quad (11)$$

Subsequently, in S1003, the geometrical information acquisition unit 902 acquires geometrical information including information indicating a view vector V=(Vx,Vy,Vz). In S1003, the light source information acquisition unit 903 acquires light source information including information indicating a light source vector L=(Lx,Ly,Lz) and information indicating a light source intensity E.

The geometrical information acquisition unit 902 sets the storage location of data (information) designated by the user for the view vector V=(Vx,Vy,Vz) indicated by the reference sign 1106 in FIG. 11. The light source information acquisition unit 903 sets the storage location of data (information) designated by the user for each of the light source vector L=(Lx,Ly,Lz) indicated by the reference sign 1107 in FIG. 11 and the light source intensity E indicated by the reference sign 1108 in FIG. 11. In response to pressing down of a geometrical and light source information read button 1109 shown in FIG. 11, the geometrical information acquisition unit 902 acquires the information indicating the view vector V=(Vx,Vy,Vz) from the storage location, and the light source information acquisition unit 903 acquires the information indicating the light source vector L=(Lx,Ly,Lz) from the storage location.

Here, a further description of FIG. 10 will be made.

Subsequently, in S1004, the image generating unit 904 generates an output image I(x,y) by using the information indicating the specular reflection intensity ρ's(x,y) reconstructed in S1102, the material appearance information, the geometrical information, and the light source information. Here, the material appearance information includes the information indicating the specular reflection width σl(x,y) and the information indicating the normal line N(x,y), acquired in S1001. The geometrical information includes the information indicating the view vector V acquired in S1003. The light source information includes the information indicating the light source vector L and the information indicating the light source intensity E, acquired in S1003.

Specifically, the image generating unit 904 calculates and generates an output image I(x,y) according to equation (12) based on Lambert's cosine law for diffuse reflection and a model of Blinn-Phong for specular reflection.

$$I(x,y)=E(\rho_d(x,y)dot(N(x,y),L)+\rho'_s(x,y)dot(N(x,y),H)^{1-\sigma l}_{(x,y)}) \quad (12)$$

In equation (12), dot(•,•) represents the inner product of vectors, and, when the inner product is negative, is replaced with 0. In equation (12), H is a vector (half vector) intermediate between the light source vector L and the view vector V and is calculated according to H=(L+V)/|L+V|.

When the process of S1004 ends, the process of the flowchart shown in FIG. 10 ends.

Advantageous Effects of Third Embodiment

In the information processing apparatus 2 according to the third embodiment, the specular reflection intensity ρs(x,y) is converted to the specular reflection perception intensity ρc(x,y) in accordance with the visual characteristics (visual characteristic curve) corresponding to the minimum value of the diffuse reflection intensity $\rho d(x,y)$. Subsequently, in the information processing apparatus 2 according to the third embodiment, the specular reflection information $\rho s_{comp}(x,y)$ reduced in the amount of data is created by resampling the converted specular reflection perception intensity $\rho c(x,y)$. In the image generating apparatus 3 according to the third embodiment, information indicating an original specular reflection intensity is reconstructed from the specular reflection information $\rho s_{comp}(x,y)$ reduced in the amount of data in the information processing apparatus 2 by using the visual characteristic curve corresponding to the minimum value of the diffuse reflection intensity $\rho d(x,y)$. Subsequently, in the image generating apparatus 3 according to the third embodiment, an image is generated by using the information indicating the reconstructed specular reflection intensity, the material appearance information, the geometrical information, and the light source information. Thus, it is possible to generate a material appearance image for the geometrical information and the light source information, given from the user, from the specular reflection information reduced in the amount of data in the information processing apparatus 2.

Fourth Embodiment

Next, a fourth embodiment will be described. In the following description of the fourth embodiment, the description of the same matter as that of the above-described first to third embodiments is omitted, and a matter different from that of the above-described first to third embodiments will be mainly described.

In the third embodiment, the image generating apparatus 3 that generates an image using specular reflection information generated in the information processing apparatus 2 according to the first embodiment has been described. In the fourth embodiment, the image generating apparatus 3 that generates an image using specular reflection information generated in the information processing apparatus 2 according to the second embodiment will be described.

The hardware components of the information processing apparatus 2 according to the fourth embodiment are similar to the hardware components of the information processing apparatus 2 according to the first embodiment, shown in FIG. 4. The logical components of the information processing apparatus 2 according to the fourth embodiment are also similar to the logical components of the information processing apparatus 2 according to the third embodiment, shown in FIG. 9.

The hardware components of the image generating apparatus 3 according to the fourth embodiment are similar to the hardware components of the image generating apparatus 3 according to the third embodiment. The logical components of the image generating apparatus 3 according to the fourth embodiment are similar to the logical components of the image generating apparatus 3 according to the third embodiment, shown in FIG. 9.

The specular reflection intensity reconstruction unit 901 according to the fourth embodiment reconstructs a specular reflection intensity $\rho's(x,y)$ expressed by an original physical quantity from the specular reflection information $\rho s_{comp}(x,y)$ reduced in the amount of data using the visual characteristic curve corresponding to the diffuse reflection intensity $\rho s(x,y)$ at each position.

The image generating unit 904 according to the fourth embodiment generates an image by using the reconstructed specular reflection intensity $\rho's(x,y)$, the diffuse reflection intensity $\rho d(x,y)$, the specular reflection width $\sigma l(x,y)$, the normal line $N(x,y)$, the view vector V, the light source vector V, and the light source intensity E.

Process that is Executed by Information Processing Apparatus 2 and Image Generating Apparatus 3

Figure 12:
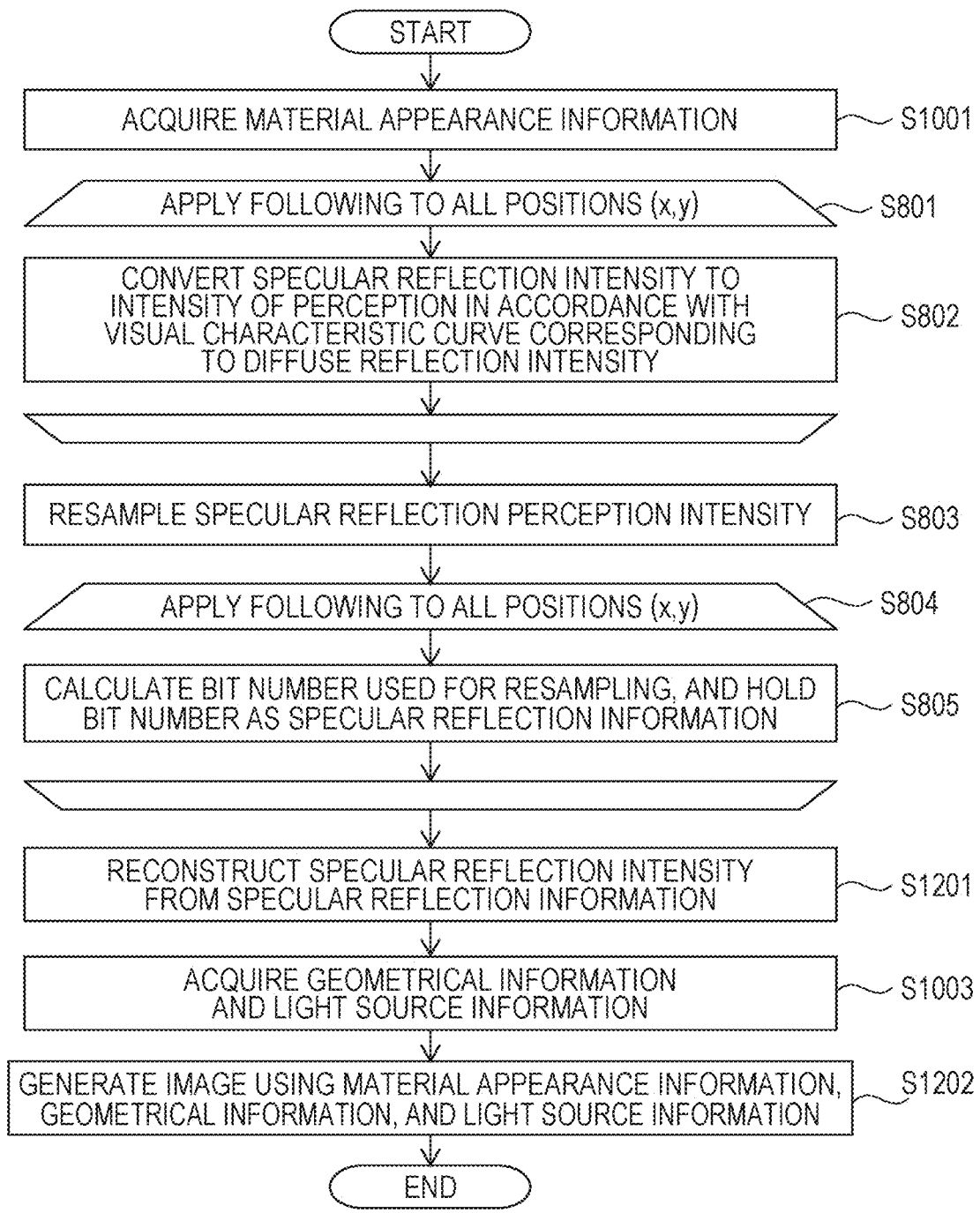
FIG. 12 is a flowchart that shows an example of a process that is executed by an information processing apparatus and an image generating apparatus according to a fourth embodiment.

FIG. 12 is a flowchart that shows an example of a procedure of an information processing method that is executed by the information processing apparatus 2 and the image generating apparatus 3 according to the fourth embodiment. In FIG. 12, like step numbers are assigned to steps similar to the steps shown in FIGS. 8 and 10.

In S1001, the material appearance information acquisition unit 501, as in the case of the third embodiment, acquires material appearance information from the data storage locations in accordance with instructions from the user. Specifically, in S1001, the material appearance information acquisition unit 501 acquires material appearance information including information indicating a diffuse reflection intensity $\rho d(x,y)$, information indicating a specular reflection intensity $\rho s(x,y)$, information indicating a specular reflection width $\sigma l(x,y)$, and information indicating a normal line $N(x,y)$.

Subsequently, S801, S802, S803, S804, and S805 are similar to the process in the second embodiment, shown in FIG. 8, so the description thereof is omitted. Through the process of S801 to S805, the specular reflection information $\rho s_{comp}(x,y)$ reduced in the amount of data used is created.

Subsequently, in S1201, the specular reflection intensity reconstruction unit 901 reconstructs a specular reflection intensity $\rho's(x,y)$ as a physical quantity from the specular reflection information $\rho s_{comp}(x,y)$. Specifically, initially, the specular reflection intensity reconstruction unit 901 reads data in units of resampling bit number $b(\rho d(x,y))$ according to the diffuse reflection intensity $\rho d(x,y)$ from the specular reflection information $\rho s_{comp}(x,y)$. Subsequently, the specular reflection intensity reconstruction unit 901 obtains a specular reflection perception intensity $\rho'c(x,y)$ before resampling by using the sampling width d according to equation (10). Subsequently, the specular reflection intensity reconstruction unit 901 reconstructs a specular reflection intensity $\rho's(x,y)$ in a physical quantity from the specular reflection perception intensity $\rho'c(x,y)$ in accordance with the visual characteristic curve by according to equation (11).

Subsequently, in S1003, the geometrical information acquisition unit 902 and the light source information acquisition unit 903, as in the case of the third embodiment, respectively acquire geometrical information and light source information.

Subsequently, in S1202, the image generating unit 904 generates an output image $I(x,y)$ by using the information indicating the specular reflection intensity $\rho's(x,y)$ reconstructed in S1201, the material appearance information, the geometrical information, and the light source information. Here, the material appearance information includes the information indicating the diffuse reflection intensity $\rho d(x,y)$ acquired in S1001, the information indicating the specular reflection width $\sigma l(x,y)$, and the information indicating the normal line $N(x,y)$. The geometrical information includes the information indicating the view vector $V=(Vx,Vy,Vz)$ acquired in S1003. The light source information includes the information indicating the light source vector $L=(Lx,Ly,Lz)$ and the information indicating the light source intensity E, acquired in S1003.

When the process of S1202 ends, the process of the flowchart shown in FIG. 12 ends.

Advantageous Effects of Fourth Embodiment

In the information processing apparatus 2 according to the fourth embodiment, the specular reflection intensity $\rho s(x,y)$ is converted to the specular reflection perception intensity ρc(x,y) in accordance with the visual characteristics (visual characteristic curve) corresponding to the diffuse reflection intensity ρd(x,y) at each position (x,y). Then, in the information processing apparatus 2 according to the fourth embodiment, the specular reflection information $\rho s_{comp}$ (x,y) reduced in the amount of data is created by resampling the converted specular reflection perception intensity ρc(x,y). In the image generating apparatus 3 according to the fourth embodiment, information indicating an original specular reflection intensity is reconstructed from the specular reflection information $\rho s_{comp}$ (x,y) reduced in the amount of data in the information processing apparatus 2 by using the visual characteristic curve corresponding to the diffuse reflection intensity at each position. Subsequently, in the image generating apparatus 3 according to the fourth embodiment, an image is generated by using the information indicating the reconstructed specular reflection intensity, the material appearance information, the geometrical information, and the light source information. Thus, it is possible to generate a material appearance image for the geometrical information and the light source information, given from the user, from the specular reflection information reduced in the amount of data in the information processing apparatus 2.

Fifth Embodiment

Next, a fifth embodiment will be described. In the following description of the fifth embodiment, the description of the same matter as that of the above-described first to fourth embodiments is omitted, and a matter different from that of the above-described first to fourth embodiments will be mainly described.
Visual Characteristics to Specular Reflection Width Next, visual characteristics to a glossiness (a degree of gloss, which is a kind of the intensity of perception felt by a human) that changes according to the specular reflection width 107 shown in FIG. 1C will be described.

Figure 13:
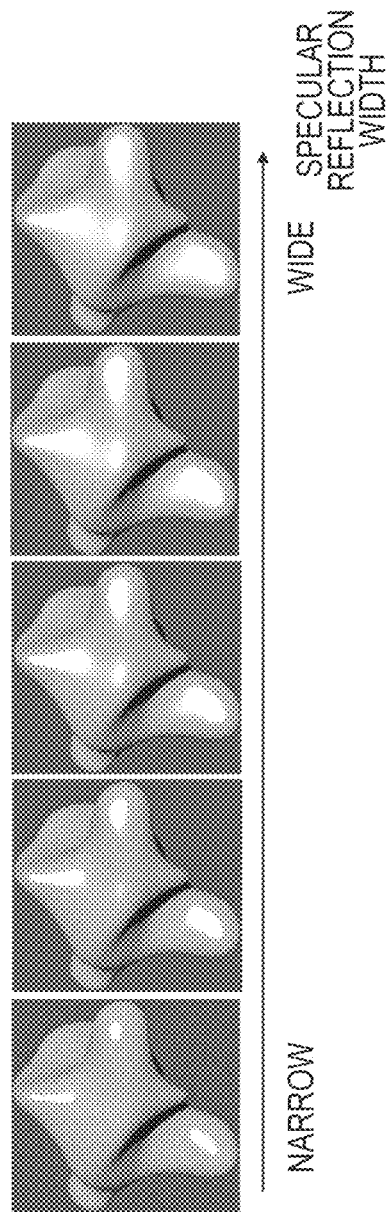
FIG. 13 is a view that shows an example of images when a specular reflection width is expanded in units of a constant value.

FIG. 13 is a view that shows an example of images when the specular reflection width 107 of FIG. 1C is expanded in units of a constant value. Specifically, FIG. 13 is a view that shows a change in glossiness for the specular reflection width 107 that belongs to specular reflection information. When the specular reflection width 107 is changed equally, a change in gloss (indicating a degree of visibility of reflections on a physical object surface) is larger when the specular reflection width 107 is narrow as compared to when the specular reflection width 107 is wide.

Figure 14:
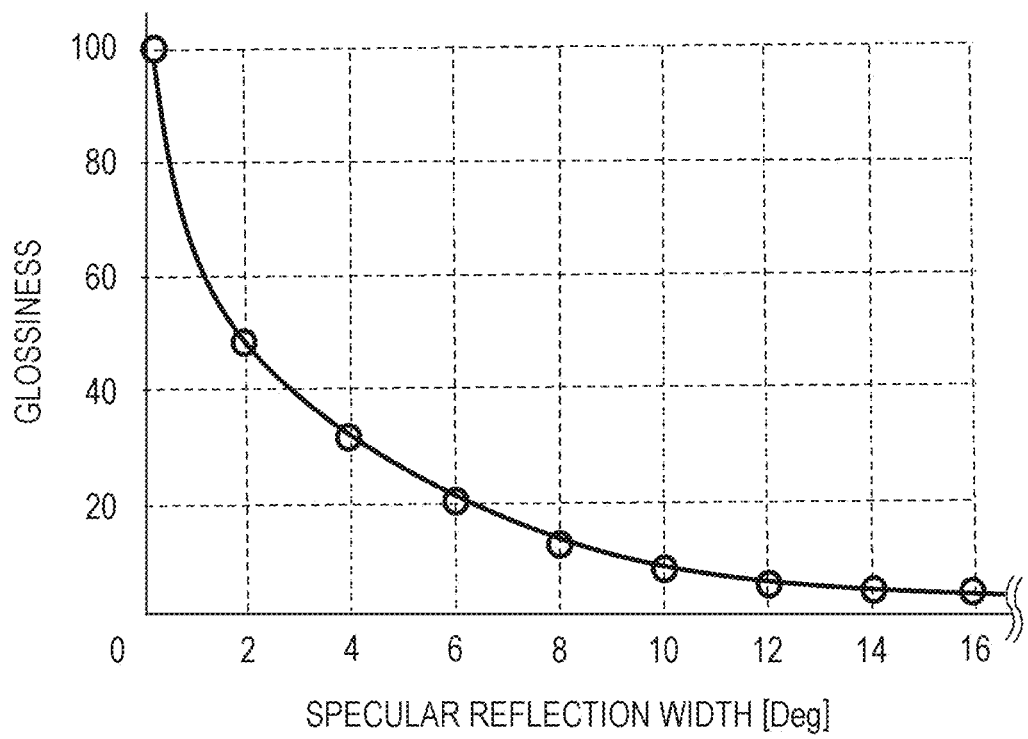
FIG. 14 is a graph that shows the relationship between specular reflection width and glossiness.

FIG. 14 is a characteristic curve that shows the relationship between the specular reflection width 107 of FIG. 1C and glossiness. Specifically, FIG. 14 is a visual characteristic curve of the specular reflection width 107 that belongs to the specular reflection information and a glossiness.

As shown in FIG. 14, there are nonlinear characteristics in which the amount of change in glossiness increases as the specular reflection width 107 narrows, while the amount of change in glossiness reduces as the specular reflection width 107 widens. Therefore, to reduce an information loss, sampling needs to be densely performed at a high sampling rate in a region in which the specular reflection width 107 is narrow as compared to a region in which the specular reflection width 107 is wide. When sampling is performed with a uniform sampling width, it can be redundant in a region in which the specular reflection width 107 is wide.

In the present embodiment, information indicating the specular reflection width 107 is converted to a glossiness in accordance with the above-described visual characteristics between the specular reflection width 107 and a glossiness, the redundancy of the region in which the specular reflection width 107 is wide is removed, and resampling is performed with a low bit number. With this procedure, it is possible to reduce the amount of data of material appearance information with reduced image quality degradation.

Specifically, in the present embodiment, the information processing apparatus that reduces the amount of data of material appearance information by way of resampling of the specular reflection width 107 using the visual characteristic curve between the specular reflection width 107 and a glossiness will be described.

The hardware components of the information processing apparatus 2 according to the fifth embodiment are similar to the hardware components of the information processing apparatus 2 according to the first embodiment, shown in FIG. 4.
Logical Components (Functional Components) of Information Processing Apparatus 2

Figure 15:
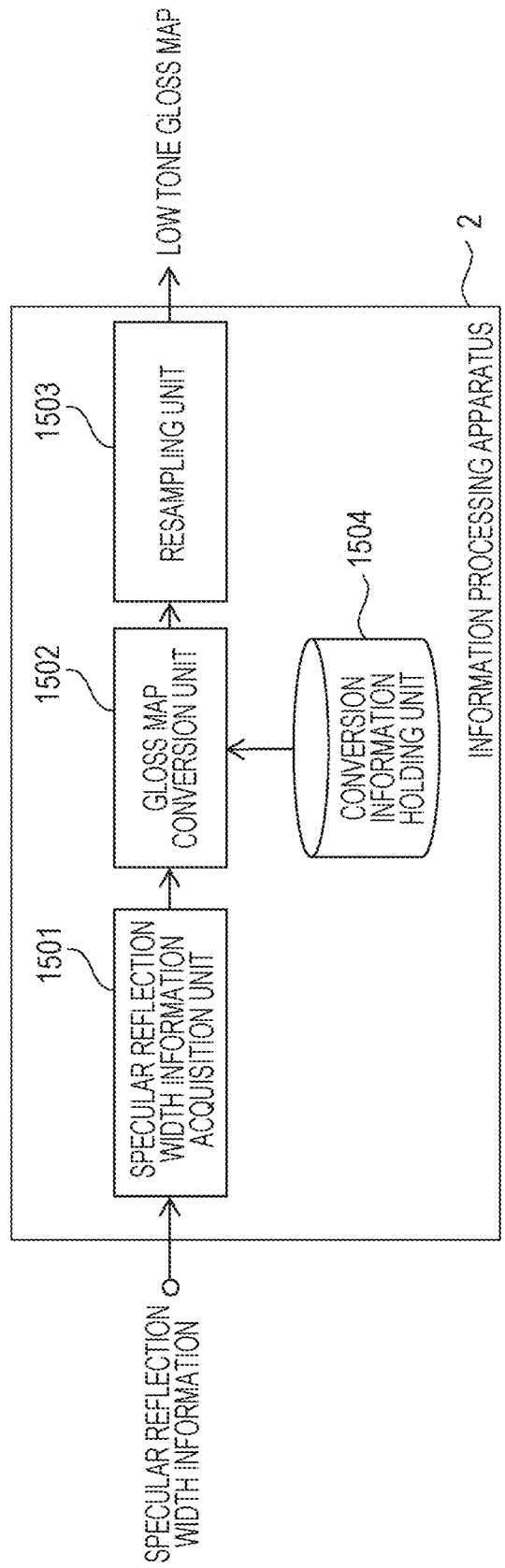
FIG. 15 is a diagram that shows an example of the logical components of an information processing apparatus according to a fifth embodiment.

FIG. 15 is a diagram that shows an example of the logical components of the information processing apparatus 2 according to the fifth embodiment. The information processing apparatus 2 according to the fifth embodiment functions as logical components 1501 to 1504 shown in FIG. 15 in a manner such that the CPU 201 shown in FIG. 4 executes computer-executable instructions stored in the ROM 202 using the RAM 203 as a work memory. The whole process described below does not need to be executed by the CPU 201; the information processing apparatus 2 may be configured such that part or whole of the process may be executed by one or multiple processing circuits, other than the CPU 201.

As shown in FIG. 15, the information processing apparatus 2 according to the fifth embodiment has logical components including a specular reflection width information acquisition unit 1501, a gloss map conversion unit 1502, a resampling unit 1503, and a conversion information holding unit 1504.

The specular reflection width information acquisition unit 1501 acquires, for example, specular reflection width information input from the user via the input device 23. The specular reflection width information is information that belongs to specular reflection information included in material appearance information. Specifically, the specular reflection width information acquisition unit 1501 acquires specular reflection width information including information indicating a specular reflection width map σ(x,y). In the specular reflection width map σ(x,y), x represents a selected position in a horizontal direction of two-dimensional data, y represents a selected position in a vertical direction of the two-dimensional data, and (x,y) represents a value of a position designated by x and y.

The gloss map conversion unit 1502 converts the specular reflection width map σ(x,y) acquired by the specular reflection width information acquisition unit 1501 to a gloss map G(x,y) concerned with the intensity of perception felt by a human in accordance with conversion information of a visual characteristic curve held by the conversion information holding unit 1504. Specifically, the gloss map conversion unit 1502 converts the specular reflection width map σ(x,y) to the gloss map G(x,y) in accordance with conversion information of the visual characteristic curve from the specular reflection width 107 to the glossiness, held by the conversion information holding unit 1504.

The resampling unit 1503 creates a low tone gloss map LG(x,y) by resampling the gloss map G(x,y) obtained by the gloss map conversion unit 1502.

The conversion information holding unit 1504 holds conversion information of the visual characteristic curve that represents the relationship between specular reflection width 107 and glossiness. The conversion information held by the conversion information holding unit 1504 includes conversion information from the specular reflection width 107 to a glossiness and conversion information from a glossiness to the specular reflection width 107. FIG. 16 is a look-up table that shows visual characteristics between the specular reflection width 107 of FIG. 1C and glossiness. In the conversion information held by the conversion information holding unit 1504, conversion information from the specular reflection width 107 to a glossiness has characteristics such that the amount of change in glossiness reduces as the specular reflection width 107 expands, like the function of visual characteristics shown in FIG. 14 or the look-up table representing visual characteristics of FIG. 16. In the conversion information held by the conversion information holding unit 1504, conversion information from a glossiness to the specular reflection width 107 has characteristics such that the amount of change in specular reflection width 107 reduces as the value of glossiness increases. For example, value A becomes value A' when converted using conversion information from the specular reflection width 107 to a glossiness; whereas value A' becomes value A when converted using conversion information from a glossiness to the specular reflection width 107.

Process that is Executed by Information Processing Apparatus 2

Figure 17:
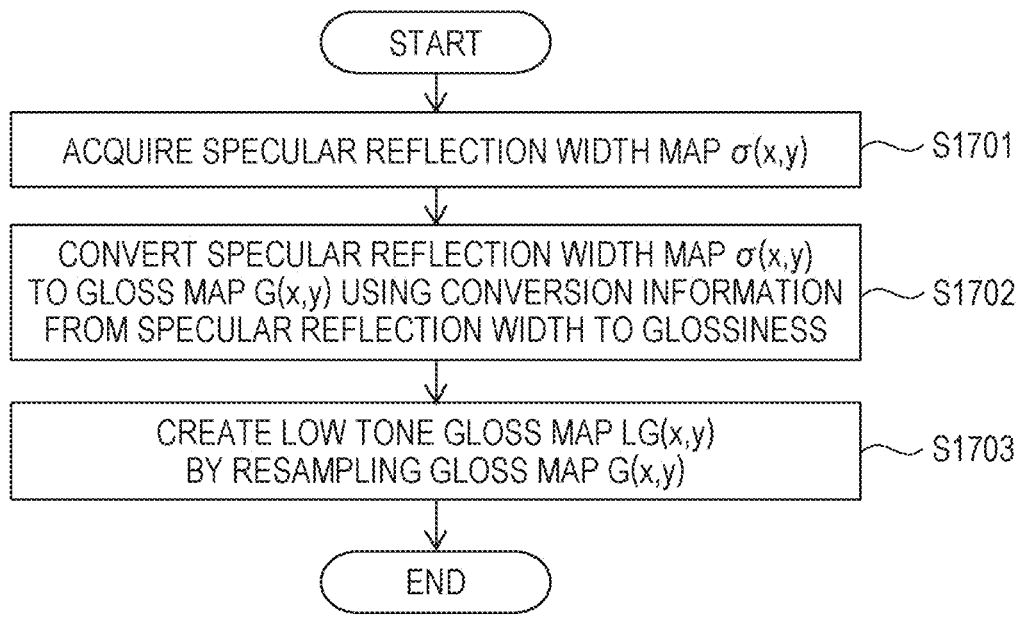
FIG. 17 is a flowchart that shows an example of a process that is executed by the information processing apparatus according to the fifth embodiment.

FIG. 17 is a flowchart that shows an example of a procedure of an information processing method that is executed by the information processing apparatus 2 according to the fifth embodiment. The process of the flowchart shown in FIG. 17 is started when the information processing apparatus 2 receives instructions for a process of reducing the amount of data of specular reflection information included in material appearance information from a user via the input device 23.

In S1701, the specular reflection width information acquisition unit 1501 acquires specular reflection width information including information indicating a specular reflection width map σ(x,y) from a data storage location in accordance with the instructions from the user.

Figure 18:
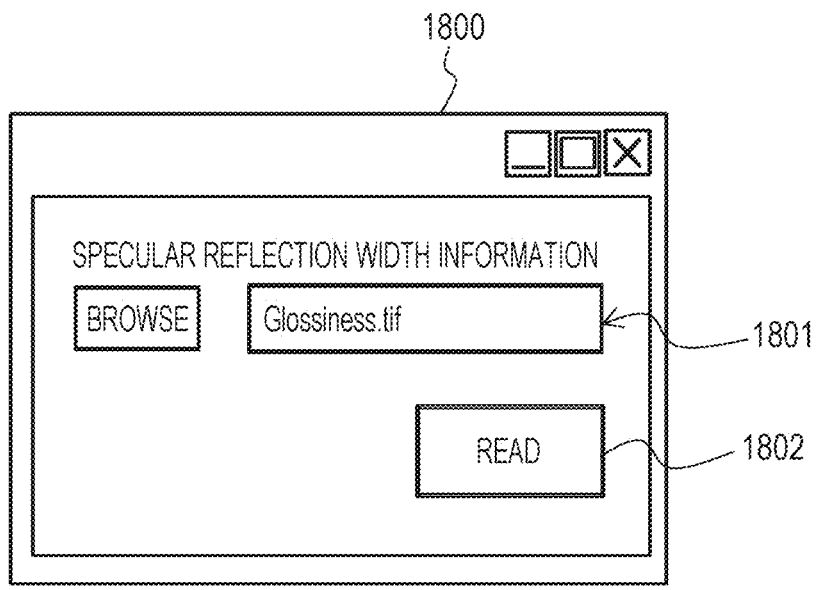
FIG. 18 is a view that shows an example of a UI screen.

FIG. 18 is a view that shows an example of a UI screen 1800 for acquiring specular reflection width information in S1701 of FIG. 17. The specular reflection width information acquisition unit 1501 sets a storage location of data (information) designated by the user for the specular reflection width information indicated by the reference sign 1801 in FIG. 18. In response to pressing down of a read button 1802 shown in FIG. 18, the specular reflection width information acquisition unit 1501 acquires the specular reflection width map σ(x,y) from the storage location. In the present embodiment, the HDD 27 is assumed as a data storage location. Also, another device connected to the information processing apparatus 2 may be a data storage location, or the information processing apparatus 2 may have a data storage unit inside. In the present embodiment, the specular reflection width map σ(x,y) is expressed in a 16-bit gray scale image format, and a range of 0[Deg] to 90[Deg] as a value of each specular reflection width is associated with a range of 0 to 65535 in pixel value.

Subsequently, in S1702, the gloss map conversion unit 1502 converts the specular reflection width map σ(x,y) acquired in S1701 to the gloss map G(x,y) using conversion information from the specular reflection width 107 to a glossiness, held by the conversion information holding unit 1504.

Subsequently, in S1703, the resampling unit 1503 creates a low tone gloss map LG(x,y) by resampling the gloss map G(x,y) obtained in S1702.

Specifically, the resampling unit 1503 initially sets the sampling width d of the gloss map G(x,y) and calculates an intermediate low tone gloss map LG'(x,y) according to the following equation (13).

$$LG'(x, y) = \text{floor}\left(\frac{(d-1) \times G(x, y)}{m}\right) \quad (13)$$

In equation (13), floor( ) is a function that rounds down to the nearest whole number.

The sampling width d is calculated according to the following equation (14) in accordance with a bit number Bn used for sampling. In equation (13), m denotes the maximum value of a value that the gloss map G(x,y) can take. The bit number Bn may be separately designated from the user. In the present embodiment, Bn is set to 8, d is set to 256, and m is set to 100.

$$d = 2^{Bn} \quad (14)$$

Subsequently, the resampling unit 1503 creates binary data in which values at positions of the calculated intermediate low tone gloss map LG'(x,y) are listed, as a low tone gloss map LG(x,y).

When the process of S1703 ends, the process of the flowchart shown in FIG. 17 ends.

Advantageous Effects of Fifth Embodiment

In the information processing apparatus 2 according to the fifth embodiment, the amount of data of material appearance information is reduced by resampling the specular reflection width 107 using the visual characteristic curve for the specular reflection width 107 that belongs to the specular reflection information. With resampling in accordance with the visual characteristic curve, it is possible to reduce the amount of data of material appearance information with less image quality degradation at the time of material appearance reproduction.

Sixth Embodiment

Next, a sixth embodiment will be described. In the following description of the sixth embodiment, the description of the same matter as that of the above-described first to fifth embodiments is omitted, and a matter different from that of the above-described first to fifth embodiments will be mainly described.

In the fifth embodiment, the information processing apparatus that reduces the amount of data of specular reflection width information in accordance with visual characteristics (visual characteristic curve) has been described. In the sixth embodiment, a system that includes an information processing apparatus and an image generating apparatus that reconstructs original specular reflection width information from specular reflection width information reduced in the amount of data by the information processing apparatus and that generates an image when light source information and geometrical information are given from the user will be described.

Logical Components (Functional Components) of Information Processing Apparatus 2 and Image Generating Apparatus 3

Figure 19:
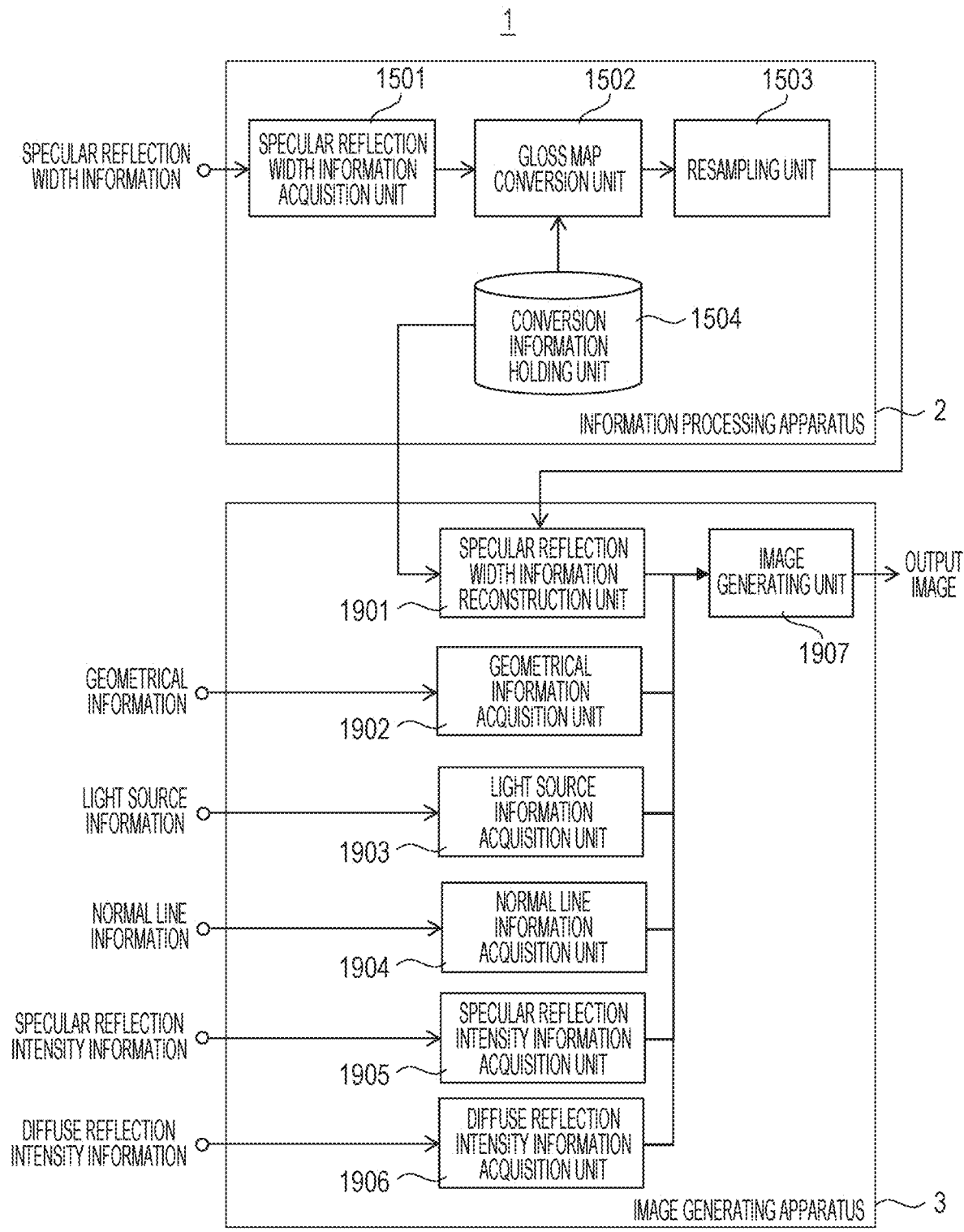
FIG. 19 is a diagram that shows an example of the logical components of an information processing apparatus and an image generating apparatus according to a sixth embodiment.

FIG. 19 is a diagram that shows an example of the logical components of the information processing apparatus 2 and the image generating apparatus 3 according to the sixth embodiment. Here, FIG. 19 shows an information processing system 1 configured to include the information processing apparatus 2 and the image generating apparatus 3. In FIG. 19, like reference signs denote components similar to the components shown in FIG. 15, and the detailed description thereof is omitted.

The information processing apparatus 2 according to the sixth embodiment, shown in FIG. 19, has similar components to the logical components of the information processing apparatus 2 according to the fifth embodiment, shown in FIG. 15. In other words, as shown in FIG. 15, the information processing apparatus 2 according to the sixth embodiment has logical components including the specular reflection width information acquisition unit 1501, the gloss map conversion unit 1502, the resampling unit 1503, and the conversion information holding unit 1504. The information processing apparatus 2 according to the sixth embodiment has similar components to the hardware components of the information processing apparatus 2 according to the first embodiment, shown in FIG. 4. At this time, the information processing apparatus 2 according to the sixth embodiment functions as logical components 1501 to 1504 shown in FIG. 19 in a manner such that the CPU 201 shown in FIG. 4 executes computer-executable instructions stored in the ROM 202 using the RAM 203 as a work memory.

As shown in FIG. 19, the image generating apparatus 3 according to the sixth embodiment has logical components including a specular reflection width information reconstruction unit 1901, a geometrical information acquisition unit 1902, a light source information acquisition unit 1903, and a normal line information acquisition unit 1904. In addition, as shown in FIG. 19, the image generating apparatus 3 according to the sixth embodiment has logical components including a specular reflection intensity information acquisition unit 1905, a diffuse reflection intensity information acquisition unit 1906, and an image generating unit 1907. The image generating apparatus 3 according to the sixth embodiment, as in the case of, for example, the hardware components of the information processing apparatus 2 according to the first embodiment, shown in FIG. 4, has hardware components including a CPU, a ROM, a RAM, a general purpose I/F, a SATA I/F, and a VC. At this time, the image generating apparatus 3 according to the sixth embodiment functions as logical components 1901 to 1907 shown in FIG. 19 in a manner such that the CPU executes computer-executable instructions stored in the ROM using the RAM as a work memory.

The specular reflection width information reconstruction unit 1901 reconstructs (decodes) a specular reflection width map σ'(x,y) from a low tone gloss map LG(x,y) created by the resampling unit 1503 using conversion information from a glossiness to the specular reflection width 107, held by the conversion information holding unit 1504.

The geometrical information acquisition unit 1902 acquires geometrical information including information indicating a view vector V=(Vx,Vy,Vz).

The light source information acquisition unit 1903 acquires light source information including information indicating a light source vector L=(Lx,Ly,Lz) and information indicating a light source intensity E.

The normal line information acquisition unit 1904 acquires normal line information including information indicating a normal line map N(x,y).

The specular reflection intensity information acquisition unit 1905 acquires specular reflection intensity information including information indicating a specular reflection intensity map ρs(x,y).

The diffuse reflection intensity information acquisition unit 1906 acquires diffuse reflection intensity information including information indicating a diffuse reflection intensity map ρd(x,y).

The image generating unit 1907 generates an image by using the specular reflection width map σ'(x,y), the specular reflection intensity map ρs(x,y), the diffuse reflection intensity map ρd(x,y), the normal line map N(x,y), the view vector V, the light source vector L, and the light source intensity E.

In the information processing system 1 shown in FIG. 19, a mode in which the specular reflection width information reconstruction unit 1901 is configured in the image generating apparatus 3 is shown; however, some embodiments of the present disclosure are not limited to this mode. For example, the present disclosure also encompasses a mode in which the specular reflection width information reconstruction unit 1901 is configured in the information processing apparatus 2.

Process that is Executed by Information Processing Apparatus 2 and Image Generating Apparatus 3

Figure 20:
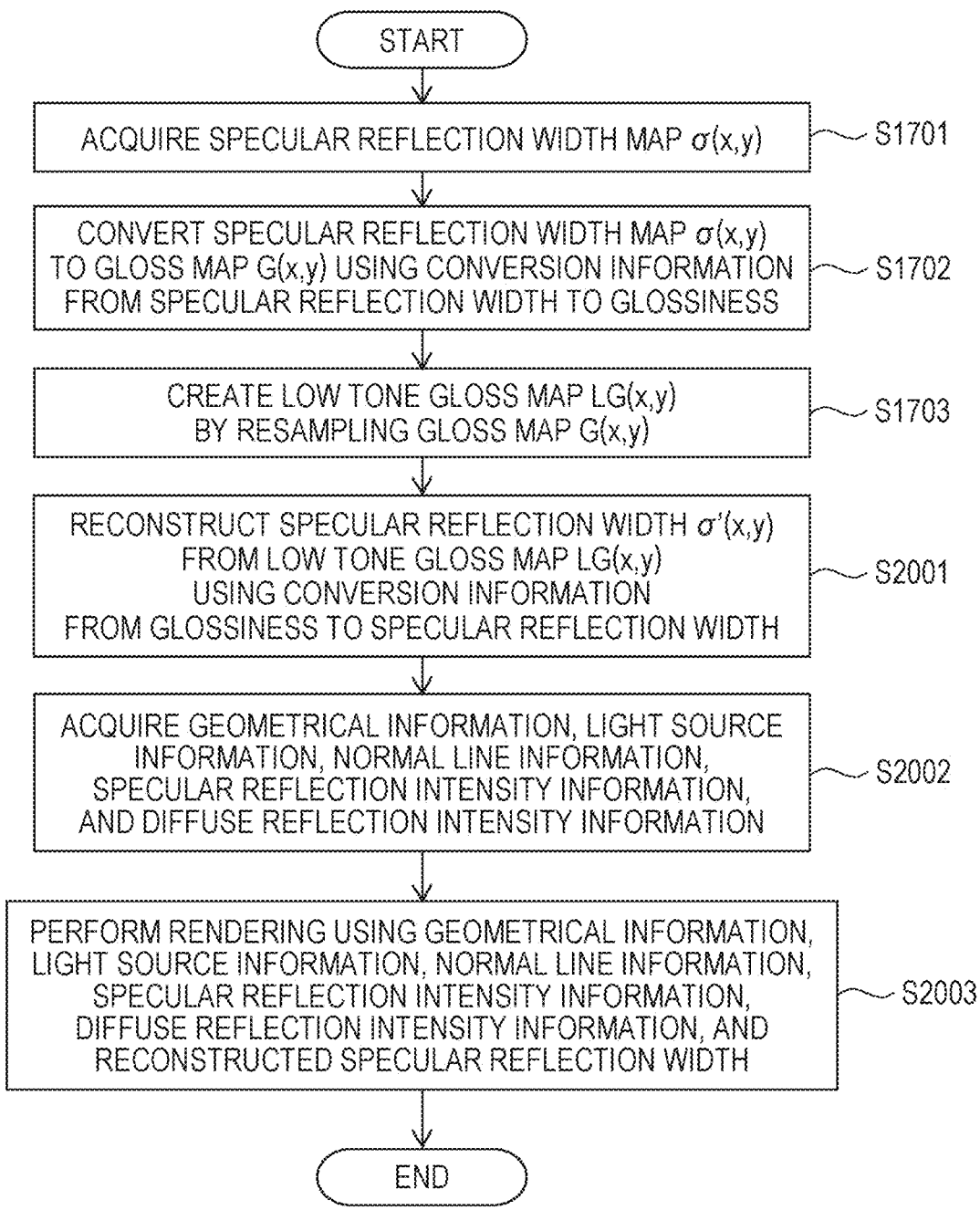
FIG. 20 is a flowchart that shows an example of a process that is executed by the information processing apparatus and the image generating apparatus according to the sixth embodiment.

FIG. 20 is a flowchart that shows an example of a procedure of an information processing method that is executed by the information processing apparatus 2 and the image generating apparatus 3 according to the sixth embodiment. In FIG. 20, like step numbers are assigned to steps similar to the steps shown in FIG. 17.

Initially, in S1701, the specular reflection width information acquisition unit 1501, as in the case of the fifth embodiment, acquires specular reflection width information including information indicating a specular reflection width map σ(x,y) from a data storage location in accordance with the instructions from the user.

Subsequently, in S1702, the gloss map conversion unit 1502, as in the case of the fifth embodiment, converts the specular reflection width map σ(x,y) acquired in S1701 to the gloss map G(x,y) using conversion information from the specular reflection width 107 to a glossiness.

Subsequently, in S1703, the resampling unit 1503, as in the case of the fifth embodiment, creates a low tone gloss map LG(x,y) by resampling the gloss map G(x,y) obtained in S1702.

Subsequently, in S2001, the specular reflection width information reconstruction unit 1901 reconstructs a specular reflection width map σ'(x,y) from a low tone gloss map LG(x,y) created in S1703 using conversion information from a glossiness to the specular reflection width 107, held by the conversion information holding unit 1504.

Subsequently, in S2002, the geometrical information acquisition unit 1902 acquires geometrical information including information indicating the view vector V from the data storage location in accordance with instructions from the user. Subsequently, in S2002, the light source information acquisition unit 1903 acquires light source information including information indicating the light source vector L and information indicating the light source intensity E from the data storage location in accordance with instructions from the user. In S2002, the normal line information acquisition unit 1904 acquires normal line information including information indicating a normal line map N(x,y) from the data storage location in accordance with instructions from the user. In S2002, the specular reflection intensity information acquisition unit 1905 acquires specular reflection intensity information including information indicating a specular reflection intensity map ρs(x,y) from the data storage location in accordance with instructions from the user. In S2002, the diffuse reflection intensity information acquisition unit 1906 acquires diffuse reflection intensity information including information indicating a diffuse reflection intensity map ρd(x,y) from the data storage location in accordance with instructions from the user.

Figure 21:
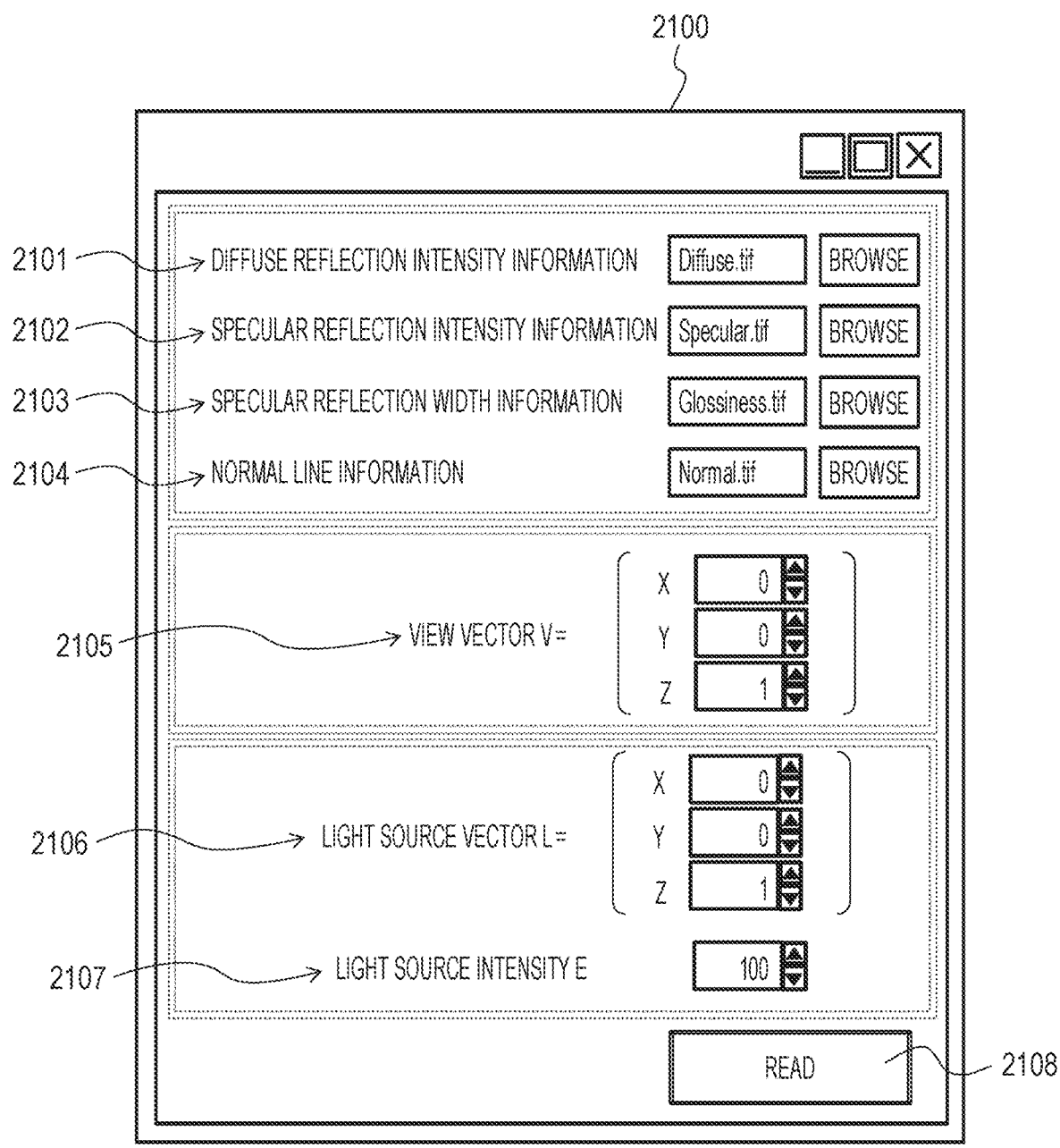
FIG. 21 is a view that shows an example of a UI screen.

FIG. 21 is a view that shows an example of a UI screen 2100 for acquiring geometrical information, light source information, normal line information, specular reflection intensity information, and diffuse reflection intensity information in S2002 of FIG. 20 and acquiring specular reflection width information in S1701 of FIG. 20. The geometrical information acquisition unit 1902 sets the storage location of data (information) designated by the user for the view vector V indicated by the reference sign 2105 in FIG. 21. The light source information acquisition unit 1903 sets the storage location of data (information) designated by the user for each of the light source vector L indicated by the reference sign 2106 in FIG. 21 and the light source intensity E indicated by the reference sign 2107 in FIG. 21. The normal line information acquisition unit 1904 sets the storage location of data (information) designated by the user for the normal line information indicated by the reference sign 2104 in FIG. 21. The specular reflection intensity information acquisition unit 1905 sets the storage location of data (information) designated by the user for the specular reflection intensity information indicated by the reference sign 2102 in FIG. 21. The diffuse reflection intensity information acquisition unit 1906 sets the storage location of data (information) designated by the user for the diffuse reflection intensity information indicated by the reference sign 2101 in FIG. 21. The specular reflection width information acquisition unit 1501 sets the storage location of data (information) designated by the user for the specular reflection width information indicated by the reference sign 2103 in FIG. 21.

In response to pressing down of a read button 2108 shown in FIG. 21, the geometrical information acquisition unit 1902 acquires geometrical information including information indicating the view vector V from the storage location. In response to pressing down of the read button 2108 shown in FIG. 21, the light source information acquisition unit 1903 acquires light source information including information indicating the light source vector L and information indicating the light source intensity E.

In response to pressing down of the read button 2108 shown in FIG. 21, the normal line information acquisition unit 1904 acquires normal line information including information indicating the normal line map N(x,y). In response to pressing down of the read button 2108 shown in FIG. 21, the specular reflection intensity information acquisition unit 1905 acquires specular reflection intensity information including information indicating the specular reflection intensity map ρs(x,y). In response to pressing down of the read button 2108 shown in FIG. 21, the diffuse reflection intensity information acquisition unit 1906 acquires diffuse reflection intensity information including information indicating the diffuse reflection intensity map ρd(x,y). In response to pressing down of the read button 2108 shown in FIG. 21, the specular reflection width information acquisition unit 1501 acquires specular reflection width information including information indicating the specular reflection width map σ(x,y). In the present embodiment, the diffuse reflection intensity map ρd(x,y) and the specular reflection intensity map ρs(x,y) are expressed in an 8-bit gray scale image format, and a range of 0 to 1 as a value of each intensity is associated with a range of 0 to 255 in pixel value. The normal line map N(x,y) is expressed in an 8-bit RGB image format. At this time, an x component (in the range of −1 to 1) of a normal line is associated with an R component (in the range of 0 to 255) of an image. A y component (in the range of −1 to 1) of the normal line is associated with a G component (in the range of 0 to 255) of the image. A z component (in the range of −1 to 1) of the normal line is associated with a B component (in the range of 0 to 255) of the image.

Here, a further description of FIG. 20 will be made.

In S2003, the image generating unit 1907 generates an image by using the specular reflection width map σ'(x,y), the specular reflection intensity map ρs(x,y), the diffuse reflection intensity map ρd(x,y), the normal line map N(x,y), the view vector V, the light source vector L, and the light source intensity E. Specifically, the image generating unit 904 calculates and generates an output image I(x,y) by using equation (12) based on Lambert's cosine law for diffuse reflection and a model of Blinn-Phong for specular reflection.

When the process of S2003 ends, the process of the flowchart shown in FIG. 20 ends.

Seventh Embodiment

Next, a seventh embodiment will be described. In the following description of the seventh embodiment, the description of the same matter as that of the above-described first to sixth embodiments is omitted, and a matter different from that of the above-described first to sixth embodiments will be mainly described.

The seventh embodiment is a mode in which a process is executed for each position (each pixel) of the specular reflection width map σ(x,y) in the fifth embodiment.

The hardware components of the information processing apparatus 2 according to the seventh embodiment are similar to the hardware components of the information processing apparatus 2 according to the first embodiment, shown in FIG. 4. The logical components of the information processing apparatus 2 according to the seventh embodiment are also similar to the logical components of the information processing apparatus 2 according to the fifth embodiment, shown in FIG. 15.

Process that is Executed by Information Processing Apparatus 2

Figure 22:
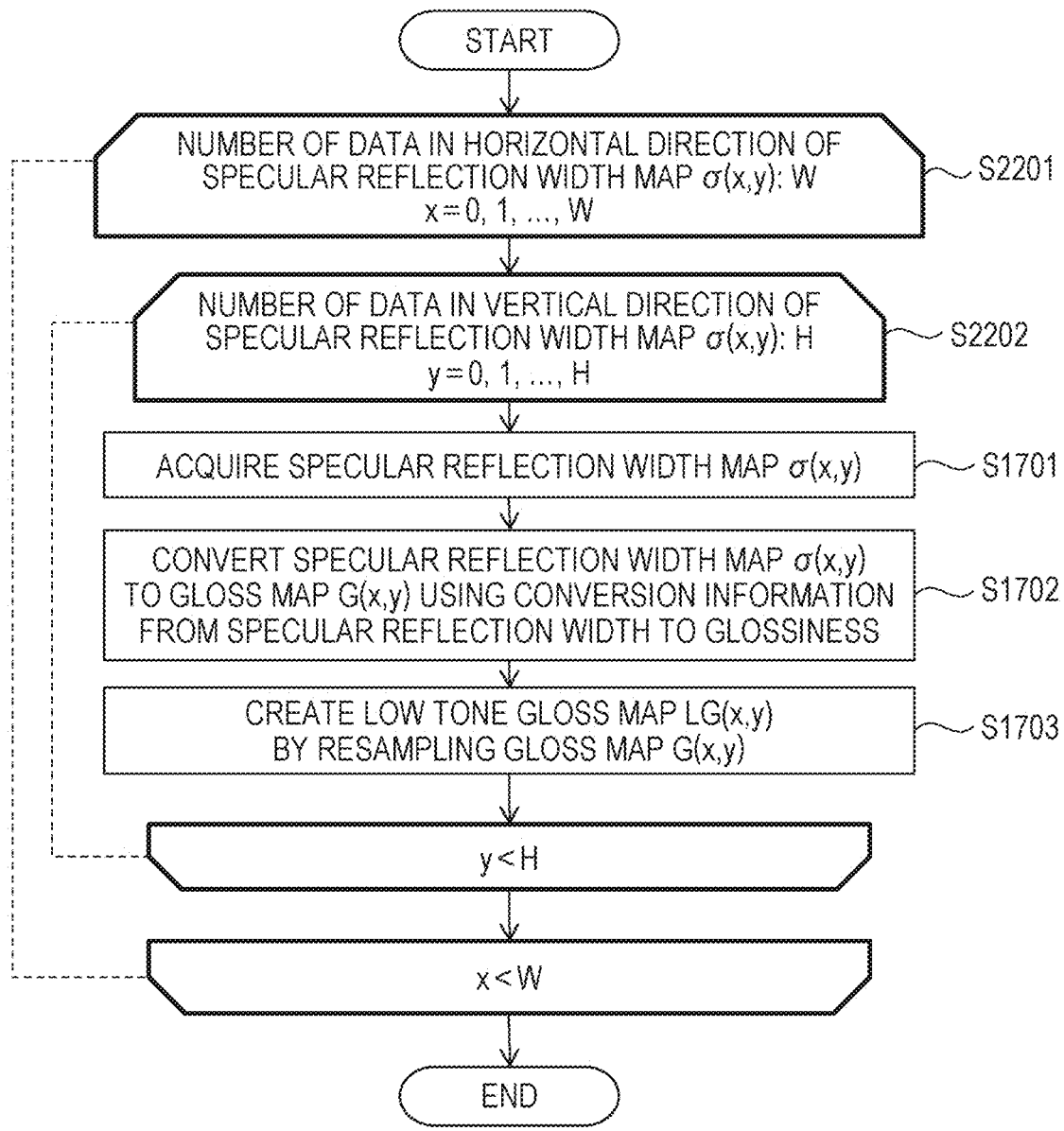
FIG. 22 is a flowchart that shows an example of a process that is executed by an information processing apparatus according to a seventh embodiment.

FIG. 22 is a flowchart that shows an example of a procedure of an information processing method that is executed by the information processing apparatus 2 according to the seventh embodiment. In FIG. 22, like step numbers are assigned to steps similar to the steps shown in FIG. 17.

Initially, in S2201, the information processing apparatus 2 according to the seventh embodiment executes a series of processing of S2202 and of S1701 to S1703 for each x where the number of data in a horizontal direction of the specular reflection width map σ(x,y) is W (x=0, 1, . . . , W).

In S2202, the information processing apparatus 2 according to the seventh embodiment executes a series of processing of S1701 to S1703 for each y where the number of data in a vertical direction of the specular reflection width map σ(x,y) is H (y=0, 1, . . . , H).

The steps of S1701 to S1703 of FIG. 22 are respectively similar to the steps of S1701 to S1703 of FIG. 17, so the description thereof is omitted.

Eighth Embodiment

Next, an eighth embodiment will be described. In the following description of the eighth embodiment, the description of the same matter as that of the above-described first to seventh embodiments is omitted, and a matter different from that of the above-described first to seventh embodiments will be mainly described.

Visual Characteristics of Human to Material Appearance

Figure 23A:
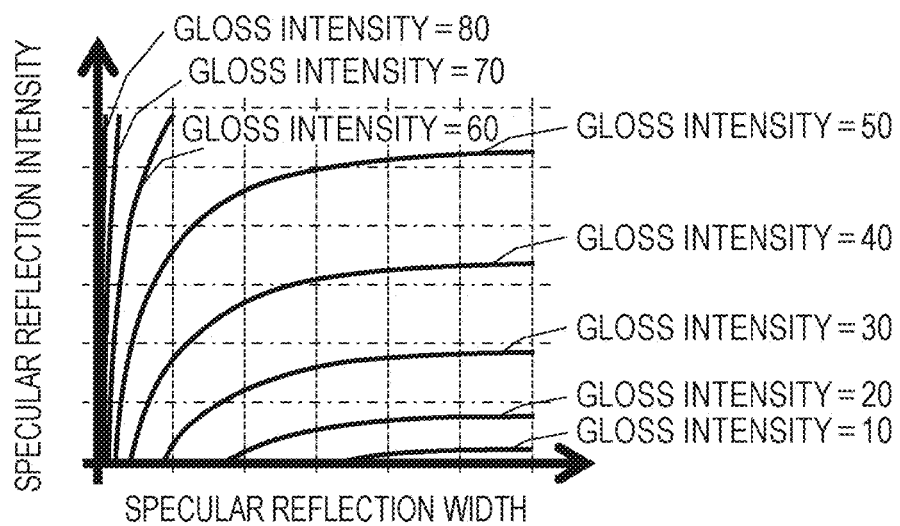
FIGS. 23A, 23B, and 23C are graphs that show the intensity (magnitude) relation of a gloss intensity perceived by a human.
Figure 23B:
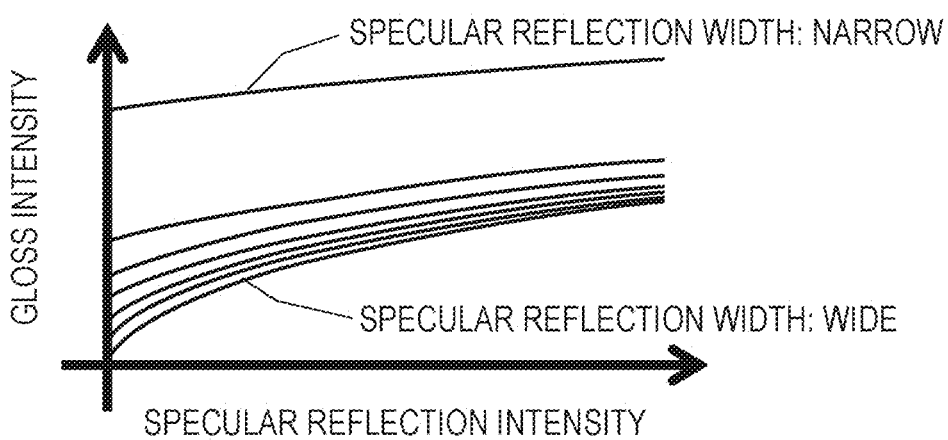
Figure 23C:
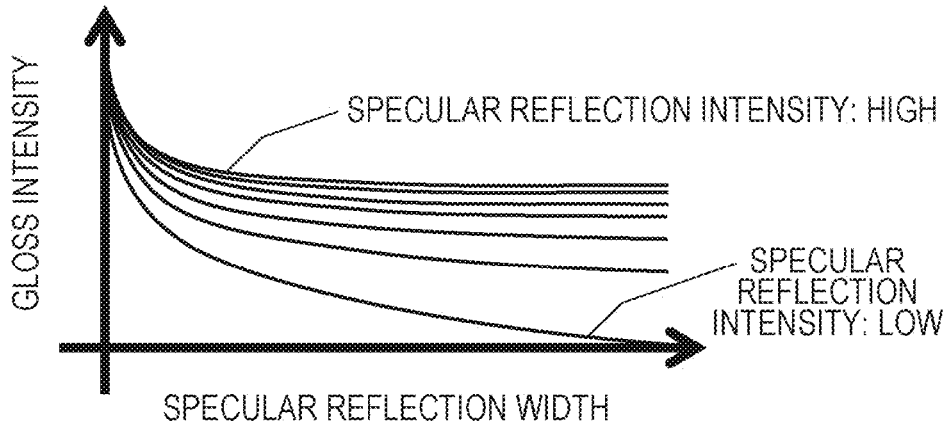

Hereinafter, the visual characteristics of a human, which is focused on in the present embodiment, will be described. In the present embodiment, the sensitivity of each of the specular reflection intensity 106 and the specular reflection width 107 in FIG. 1C to a gloss intensity perceived by a human, is focused. Particularly, the sensitivity of the specular reflection intensity 106 that changes according to a degree of the spread of the specular reflection width 107 to a gloss intensity and the sensitivity of the specular reflection width 107 that changes according to the intensity (magnitude) of the specular reflection intensity 106 to a gloss intensity are considered. FIGS. 23A, 23B, and 23C are characteristic curves that show the intensity (magnitude) relation of a gloss intensity perceived by a human to each of the specular reflection width 107 and the specular reflection intensity 106 in FIG. 1C. FIG. 23A is a characteristic curve that shows a change in specular reflection intensity 106 to a change in specular reflection width 107 for each gloss intensity. As shown in FIG. 23A, as the specular reflection width 107 narrows (reduces) or as the specular reflection intensity 106 rises (increases), the gloss intensity perceived by a human rises, and the gloss intensity nonlinearly correlates with the specular reflection width 107 and the specular reflection intensity 106. FIG. 23B is a characteristic curve that shows a change in gloss intensity to a change in specular reflection intensity 106 for each specular reflection width 107 (which is a characteristic curve that shows a change in gloss intensity on a dashed line in the vertical direction in FIG. 23A). In FIG. 23B, in comparison with the case where the specular reflection width 107 is wide (large), the gloss intensity is high but the width of a change in gloss intensity to a change in specular reflection intensity 106 exhibits a small, gentle change in the case where the specular reflection width 107 is narrow (small). This shows that the influence on gloss intensity is greater from a change in specular reflection width 107 than from a change in specular reflection intensity 106 as the specular reflection width 107 narrows (reduces), that is, as a reflection image of a light source on a physical object surface sharpens. FIG. 23C is a characteristic curve that shows a change in gloss intensity to a change in specular reflection width 107 for each specular reflection intensity 106 (which is a characteristic curve that shows a change in gloss intensity on an alternate long and short dashed line in the horizontal direction in FIG. 23A). In FIG. 23C, in comparison with the case where the specular reflection intensity 106 is low (small), the gloss intensity is high but the width of a change in gloss intensity to a change in specular reflection intensity 106 exhibits a small, gentle change in the case where the specular reflection intensity 106 is high (large). This shows that the influence on gloss intensity is greater from a change in specular reflection intensity 106 than from a change in specular reflection width 107 as the specular reflection intensity 106 lowers (reduces), that is, as a reflection image of a light source on a physical object surface darkens.

In the present embodiment, the amount of data of material appearance information is reduced by resampling the specular reflection intensity 106 and the specular reflection width 107 in a space linear to the intensity of perception in accordance with visual characteristics of the above-described specular reflection intensity 106 and specular reflection width 107 to a gloss intensity. At this time, as the specular reflection intensity 106 increases, it is possible to reduce a bit number used to represent the specular reflection width 107, and, as the specular reflection width 107 reduces, it is possible to reduce a bit number used to represent the specular reflection intensity 106.

In the present embodiment, an information processing apparatus that reduces the amount of data of material appearance information by resampling the specular reflection intensity 106 using a visual characteristic curve of the specular reflection width 107 for a gloss intensity will be described.

The hardware components of the information processing apparatus 2 according to the eighth embodiment are similar to the hardware components of the information processing apparatus 2 according to the first embodiment, shown in FIG. 4.

Logical Components (Functional Components) of Information Processing Apparatus 2

Figure 24:
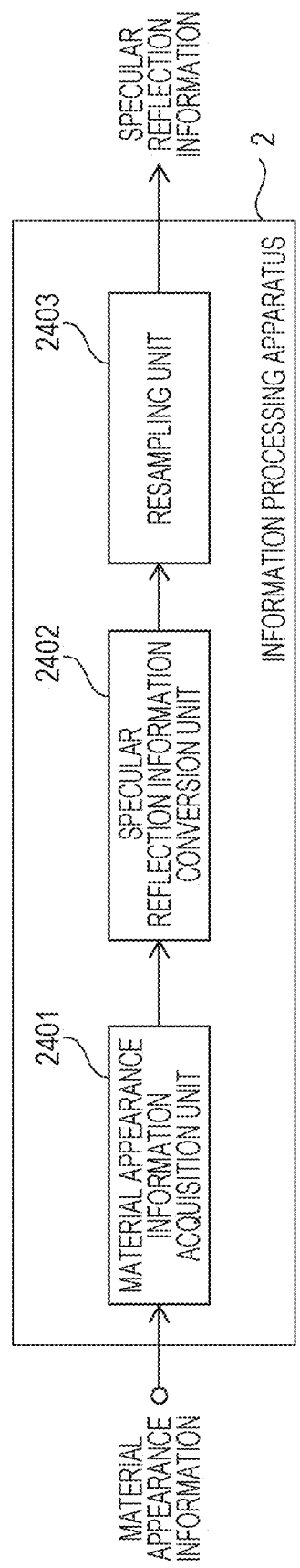
FIG. 24 is a diagram that shows an example of the logical components of an information processing apparatus according to an eighth embodiment.

FIG. 24 is a diagram that shows an example of the logical components of the information processing apparatus 2 according to the eighth embodiment. The information processing apparatus 2 according to the eighth embodiment functions as logical components 2401 to 2403 shown in FIG. 24 in a manner such that the CPU 201 shown in FIG. 4 executes computer-executable instructions stored in the ROM 202 using the RAM 203 as a work memory. The whole process described below does not need to be executed by the CPU 201; the information processing apparatus 2 may be configured such that part or whole of the process may be executed by one or multiple processing circuits, other than the CPU 201.

As shown in FIG. 24, the information processing apparatus 2 according to the eighth embodiment has logical components including a material appearance information acquisition unit 2401, a specular reflection information conversion unit 2402, and a resampling unit 2403.

The material appearance information acquisition unit 2401 acquires material appearance information including information indicating a specular reflection intensity $\rho s(x,y)$ corresponding to the specular reflection intensity 106 of FIG. 1C and information indicating a specular reflection width $\rho l(x,y)$ corresponding to the specular reflection width 107 of FIG. 1C. Here, the information indicating the diffuse reflection intensity $\rho d(x,y)$ and the information indicating the specular reflection width $\rho l(x,y)$ are information that belongs to specular reflection information.

The specular reflection information conversion unit 2402 converts the specular reflection intensity $\rho s(x,y)$ to the intensity of perception $\rho sp(x,y)$ of specular reflection intensity in accordance with visual characteristics (visual characteristic curve) of the specular reflection intensity $\rho s(x,y)$ for a gloss intensity for a mean value of the specular reflection width $\rho l(x,y)$.

The resampling unit 2403 creates specular reflection information $\rho s_{comp}(x,y)$ reduced in the amount of data used, by resampling the intensity of perception $\rho sp(x,y)$ of specular reflection intensity obtained by the specular reflection information conversion unit 2402.

Process that is Executed by Information Processing Apparatus 2

Figure 25:
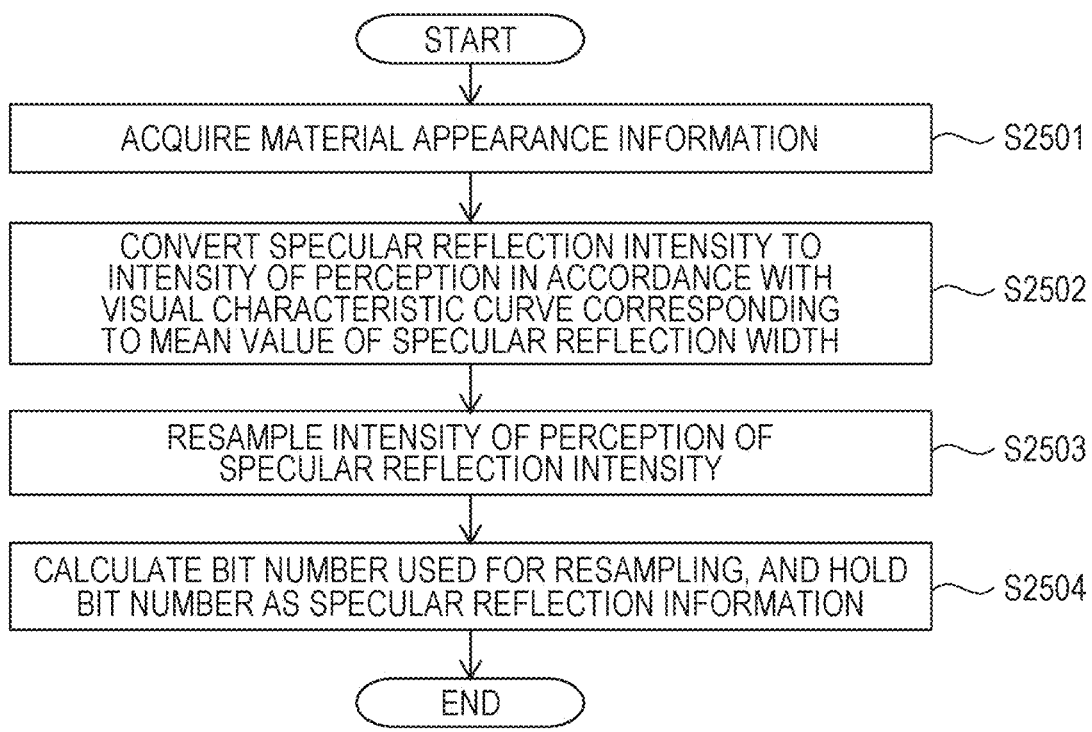
FIG. 25 is a flowchart that shows an example of a process that is executed by the information processing apparatus according to the eighth embodiment.

FIG. 25 is a flowchart that shows an example of a procedure of an information processing method that is executed by the information processing apparatus 2 according to the eighth embodiment. The process of the flowchart shown in FIG. 25 is started when the information processing apparatus 2 receives instructions for a process of reducing the amount of data of material appearance information from a user via the input device 23. Hereinafter, in the flowchart shown in FIG. 25, "S" is prefixed to the reference sign in each step.

In S2501, the material appearance information acquisition unit 2401 acquires material appearance information including information indicating a specular reflection intensity $\rho s(x,y)$ and information indicating a specular reflection width $\rho l(x,y)$ from the data storage location in accordance with instructions from the user.

Figure 26:
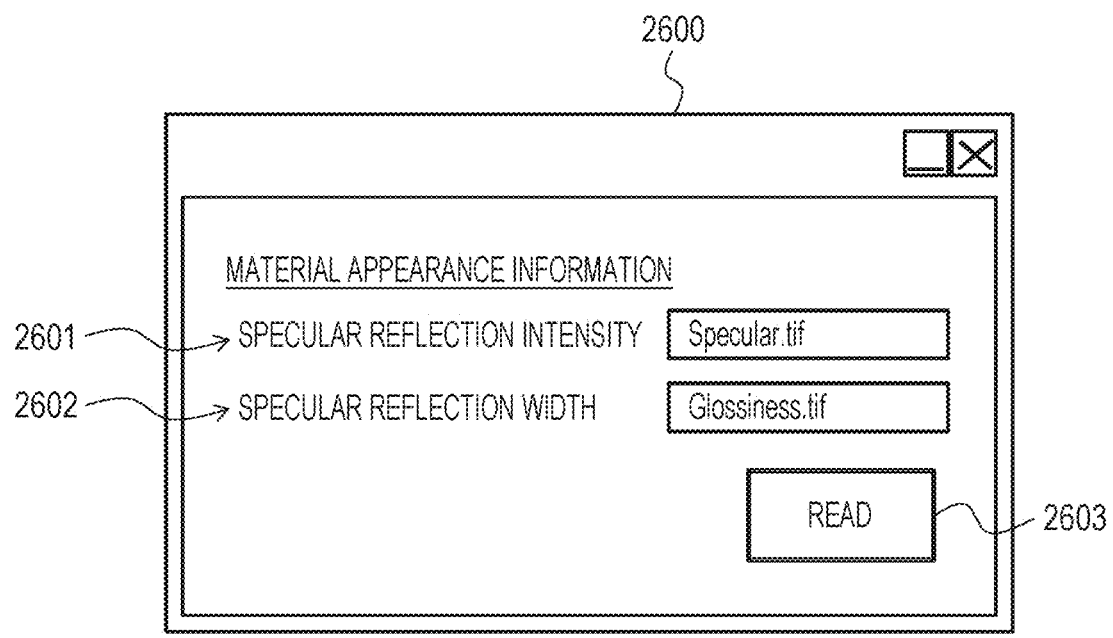
FIG. 26 is a view that shows an example of a UI screen.

FIG. 26 is a view that shows an example of a UI screen 2600 for acquiring material appearance information in S2501 of FIG. 25. The material appearance information acquisition unit 2401 sets the storage location of data (information) designated by the user for each of the specular reflection intensity $\rho s(x,y)$ indicated by the reference sign 2601 in FIG. 26 and the specular reflection width $\rho l(x,y)$ indicated by the reference sign 2602 in FIG. 26. In response to pressing down of a read button 2603 shown in FIG. 26, the material appearance information acquisition unit 2401 acquires information indicating the specular reflection intensity $\rho s(x,y)$ and information indicating the specular reflection width $\rho l(x,y)$. In the present embodiment, the HDD 27 is assumed as a data storage location. Also, another device connected to the information processing apparatus 2 may be a data storage location, or the information processing apparatus 2 may have a data storage unit inside. In the present embodiment, the information indicating the specular reflection intensity $\rho s(x,y)$ and the information indicating the specular reflection width $\rho l(x,y)$ are expressed in a 16-bit gray scale image format, and a value of each of the specular reflection intensity and the specular reflection width is associated with a range of 0 to 65535 in pixel value.

Here, a further description of FIG. 25 will be made.

Subsequently, in S2502, the specular reflection information conversion unit 2402 converts the specular reflection intensity $\rho s(x,y)$ acquired in S2501 to the intensity of perception $\rho sp(x,y)$ of specular reflection intensity in accordance with a visual characteristic curve corresponding to the mean value of the specular reflection width $\rho l(x,y)$ acquired in S2501. The details of S2502 will be described below.

Initially, the specular reflection information conversion unit 2402 acquires a mean value $\rho l_{ave}$ of the specular reflection width $\rho l(x,y)$ according to the following equation (15).

$$\rho_{l_{ave}} = \frac{1}{MN}\sum_{y=1}^{N}\sum_{x=1}^{M}\rho_l(x,y) \tag{15}$$

Subsequently, the specular reflection information conversion unit 2402 converts the specular reflection intensity $\rho s(x,y)$ to the intensity of perception $\rho sp(x,y)$ of specular reflection intensity by using the visual characteristic curve corresponding to the mean value $\rho l_{ave}$ of specular reflection width. In the present embodiment, the specular reflection intensity $\rho s(x,y)$ is converted to the intensity of perception $\rho sp(x,y)$ of specular reflection intensity according to the visual characteristic curve expressed by the following equation (16).

$$\rho_{sp(x,y)} = \sqrt{k_1 f(\rho_s(x,y)) + k_2(g(\rho_{l_{ave}}))^2} \tag{16}$$

In equation (16), $f(\rho s)$ and $g(\rho l)$ are respectively expressed by the following equations (17) and (18).

$$f(\rho_s) = k_3 \rho_3 \tag{17}$$

$$g(\rho_l) = k_4 \log\left(\frac{k_5}{\log(\cos(k_6 \rho_l))}\right) + k_7 \tag{18}$$

In equations (16) to (18), kn (n is a natural number) is a coefficient or a constant in equation and is determined so as to fit to the intensity of perception of a human. A value of k is obtained such that a coefficient of correlation between a psychophysical quantity obtained from equations (16) to (18) for the specular reflection intensity and the specular reflection width, obtained by measuring samples with different degrees of the specular reflection intensity $\rho s(x,y)$ or the specular reflection width $\rho l(x,y)$, and a subjective evaluation value obtained by a subjective evaluation experiment increases.

Subsequently, in S2503, the resampling unit 2403 resamples the intensity of perception $\rho sp(x,y)$ of specular reflection intensity, obtained in S2502. Specifically, the resampling unit 2403 sets a sampling width d of the intensity of perception $\rho sp(x,y)$ of specular reflection intensity and calculates a resampled specular reflection intensity perception intensity $\rho sp_{re}(x,y)$ according to the following equation (19).

$$\rho_{sp_{re}}(x,y) = \text{floor}\left(\frac{\rho_{sp}(x,y)}{d}\right) \tag{19}$$

In equation (19), floor( ) is a function that rounds down to the nearest whole number. In equation (19), the sampling width d is set in accordance with a differential threshold of the intensity of perception $\rho sp$ of specular reflection intensity. The sampling width d may be separately designated by the user.

Subsequently, in S2504, the resampling unit 2403 calculates a bit number used to represent the values of the resampled specular reflection intensity perception intensity $\rho sp_{re}(x,y)$ obtained in S2503 and holds specular reflection information $\rho s_{comp}(x,Y)$ in accordance with the bit number. The details of S2504 will be described below.

Initially, the resampling unit 2403, for the mean value $\rho l_{ave}$ of specular reflection width, obtains the maximum value and the minimum value of the resampled specular reflection intensity perception intensity $\rho sp$, in a range (0 to 65535) that the specular reflection intensity can take, according to the following equations (20) and (21).

$$\rho_{sp_{re\_max}} = \text{floor}\left(\frac{\sqrt{k_1 f(65535) + k_2(g(\rho_{l_{ave}}))^2}}{d}\right) \tag{20}$$

$$\rho_{sp_{re\_min}} = \text{floor}\left(\frac{\sqrt{k_1 f(0) + k_2(g(\rho_{l_{ave}}))^2}}{d}\right) \tag{21}$$

A difference between $\rho sp_{re\_max}$ in equation (20) and $\rho sp_{re\_min}$ in equation (21) is the maximum range that the resampled specular reflection intensity perception intensity $\rho sp_{re}(x,y)$ can take. With a bit number used for the representation, it is possible to represent the value of the resampled specular reflection intensity perception intensity $\rho sp_{re}(x,y)$ without excess. The resampling unit 2403 also calculates a resampling bit number bit_num used to represent the resampled specular reflection intensity perception intensity $\rho sp$ re $(x,y)$ according to the following equation (22).

$$\text{bit\_num} = \text{ceil}(\log_2(\rho_{sp_{re\_max}} - \rho_{sp_{re\_min}})) \quad (22)$$

In equation (22), ceil( ) is a function that rounds up to the nearest whole number. Subsequently, the resampling unit 2403 sets specular reflection information $\rho s_{comp}(x,y)$ in accordance with the resampling bit number bit_num used to represent the values of the resampled specular reflection intensity perception intensity $\rho sp_{re}(x,y)$. Specifically, the resampling unit 2403 holds binary specular reflection information $\rho s_{comp}(x,y)$ in which values at positions of the resampled specular reflection intensity perception intensity $\rho sp_{re}(x,y)$ are listed in units of the resampling bit number bit_num.

When the process of S2504 ends, the process of the flowchart shown in FIG. 25 ends.

Advantageous Effects of Eighth Embodiment

In the information processing apparatus 2 according to the eighth embodiment, the specular reflection intensity $\rho s(x,y)$ is converted to the intensity of perception $\rho sp(x,y)$ of specular reflection intensity in accordance with the visual characteristics (visual characteristic curve) corresponding to the mean value of the specular reflection width $\rho l(x,y)$. In the information processing apparatus 2 according to the eighth embodiment, the amount of data of material appearance information is reduced by resampling the converted intensity of perception $\rho sp(x,y)$ of specular reflection intensity. With resampling in accordance with the above-described human visual characteristics (visual characteristic curve), it is possible to reduce the amount of data of material appearance information with less image quality degradation at the time of material appearance reproduction.

Ninth Embodiment

Next, a ninth embodiment will be described. In the following description of the ninth embodiment, the description of the same matter as that of the above-described first to eighth embodiments is omitted, and a matter different from that of the above-described first to eighth embodiments will be mainly described.

In the eighth embodiment, the specular reflection intensity $\rho s(x,y)$ is resampled by using visual characteristics (visual characteristic curve) corresponding to the mean value of the specular reflection width $\rho l(x,y)$. In the ninth embodiment, an information processing apparatus that resamples the specular reflection width $\rho l(x,y)$ by using visual characteristics (visual characteristic curve) corresponding to the mean value of the specular reflection intensity $\rho s(x,y)$ will be described.

The hardware components of the information processing apparatus 2 according to the ninth embodiment are similar to the hardware components of the information processing apparatus 2 according to the first embodiment, shown in FIG. 4. The logical components of the information processing apparatus 2 according to the ninth embodiment are also similar to the logical components of the information processing apparatus 2 according to the eighth embodiment, shown in FIG. 24.

Here, the logical components of the information processing apparatus 2 according to the ninth embodiment will be described with reference to FIG. 24. The material appearance information acquisition unit 2401 acquires material appearance information including information indicating a specular reflection intensity $\rho s(x,y)$ corresponding to the specular reflection intensity 106 of FIG. 1C and information indicating a specular reflection width $\rho l(x,y)$ corresponding to the specular reflection width 107 of FIG. 1C. The specular reflection information conversion unit 2402 converts the specular reflection width $\rho l(x,y)$ to the intensity of perception $\rho lp(x,y)$ of specular reflection width in accordance with visual characteristics (visual characteristic curve) of the specular reflection width $\rho l(x,y)$ to a gloss intensity for the mean value of the specular reflection intensity $\rho s(x,y)$. The resampling unit 2403 creates specular reflection information $\rho l_{comp}(x,y)$ reduced in the amount of data used, by resampling the intensity of perception $\rho lp(x,y)$ of specular reflection width obtained by the specular reflection information conversion unit 2402.

Process that is Executed by Information Processing Apparatus 2

Figure 27:
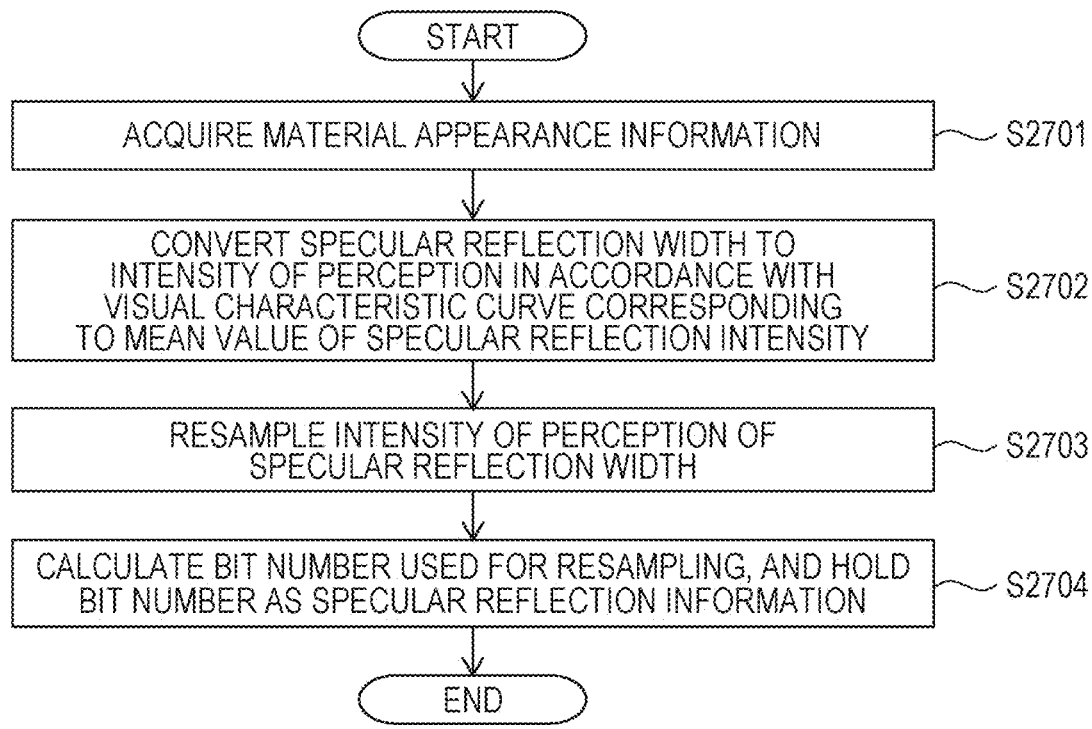
FIG. 27 is a flowchart that shows an example of a process that is executed by an information processing apparatus according to a ninth embodiment.

FIG. 27 is a flowchart that shows an example of a procedure of an information processing method that is executed by the information processing apparatus 2 according to the ninth embodiment.

In S2701, the material appearance information acquisition unit 2401 acquires material appearance information including information indicating a specular reflection intensity $\rho s(x,y)$ and information indicating a specular reflection width $\rho l(x,y)$ from the data storage location in accordance with instructions from the user. In the present embodiment, the information indicating the specular reflection intensity $\rho s(x,y)$ and the information indicating the specular reflection width $\rho l(x,y)$ are expressed in a 16-bit gray scale image format, and a value of each of the specular reflection intensity and the specular reflection width is associated with a range of 0 to 65535 in pixel value.

Subsequently, in S2702, the specular reflection information conversion unit 2402 converts the specular reflection width $\rho l(x,y)$ to the intensity of perception $\rho lp(x,y)$ of specular reflection width in accordance with a visual characteristic curve corresponding to the mean value of the specular reflection intensity $\rho s(x,y)$ acquired in S2701. The details of S2702 will be described below.

Initially, the specular reflection information conversion unit 2402 acquires a mean value $\rho s_{ave}$ of the specular reflection intensity $\rho s(x,y)$ according to the following equation (23).

$$\rho_{s_{ave}} = \frac{1}{MN}\sum_{y=1}^{N}\sum_{x=1}^{M}\rho_s(x,y) \quad (23)$$

Subsequently, the specular reflection information conversion unit 2402 converts the specular reflection width $\rho l(x,y)$ to the intensity of perception $\rho lp(x,y)$ of specular reflection width by using the visual characteristic curve corresponding to the mean value $\rho s_{ave}$ of the specular reflection intensity.

In the present embodiment, the specular reflection width $\rho l(x,y)$ is converted to the intensity of perception $\rho lp(x,y)$ of specular reflection width according to the visual characteristic curve expressed by the following equation (24).

$$\rho_{lp(x,y)} = \sqrt{k_1 f(\rho_{s_{ave}}) + k_2(g(\rho_l(x,y)))^2} \quad (24)$$

In equation (24), $f(\rho s)$ and $g(\rho l)$ are respectively expressed by equations (17) and (18) described above.

Subsequently, in S2703, the resampling unit 2403 resamples the intensity of perception $\rho lp(x,y)$ of specular reflection width, obtained in S2702. Specifically, the resampling unit 2403 sets a sampling width d of the intensity of perception $\rho lp(x,y)$ of specular reflection width and calculates a resampled specular reflection width perception intensity $\rho lp\,re\,(x,y)$ according to the following equation (25).

$$\rho_{lp_{re}}(x, y) = \text{floor}\left(\frac{\rho_{lp}(x, y)}{d}\right) \quad (25)$$

In equation (25), floor( ) is a function that rounds down to the nearest whole number. In equation (25), the sampling width d is set in accordance with a differential threshold of the intensity of perception $\rho lp$ of specular reflection width. The sampling width d may be separately designated by the user.

Subsequently, in S2704, the resampling unit 2403 calculates a bit number used to represent the values of the resampled specular reflection width perception intensity $\rho lp_{re}(x,y)$ obtained in S2703 and holds specular reflection information $\rho l_{comp}(x,y)$ in accordance with the bit number. The details of S2704 will be described below.

Initially, the resampling unit 2403, for the mean value $\rho s_{ave}$ of the specular reflection intensity, obtains the maximum value and the minimum value of the resampled specular reflection width perception intensity $\rho lp_{re}(x,y)$ in a range (0 to 65535) that the specular reflection width can take, according to the following equations (26) and (27).

$$\rho_{lp_{re}\_max} = \sqrt{k_1 f(\rho_{s_{ave}}) + k_2(g(0))^2} \quad (26)$$

$$\rho_{lp_{re}\_min} = \sqrt{k_1 f(\rho_{s_{ave}}) + k_2(g(65535))^2} \quad (27)$$

In equation (26), $g(0)=1$ (maximum value that the function g can take). A difference between $\rho lp_{re\_max}$ in equation (26) and $\rho lp_{re\_min}$ in equation (27) is the maximum range that the resampled specular reflection width perception intensity $\rho lp_{re}(x,y)$ can take. With a bit number used for the representation, it is possible to represent the value of the resampled specular reflection width perception intensity $\rho lp_{re}\,(x,y)$ with the minimum number of bits. The resampling unit 2403 also calculates a resampling bit number bit_num used to represent the resampled specular reflection width perception intensity $\rho lp_{re}\,(x,y)$ according to the following equation (28).

$$\text{bit\_num} = \text{ceil}\left(\log_2\left(\rho_{lp_{re}\_max} - \rho_{lp_{re}\_min}\right)\right) \quad (28)$$

In equation (28), ceil( ) is a function that rounds up to the nearest whole number. Subsequently, the resampling unit 2403 sets specular reflection information $\rho l_{comp}\,(x,y)$ in accordance with the resampling bit number bit_num used to represent the values of the resampled specular reflection width perception intensity $\rho lp_{re}\,(x,y)$. Specifically, the resampling unit 2403 holds binary specular reflection information $\rho l_{comp}\,(x,y)$ in which values at positions of the resampled specular reflection width perception intensity $\rho lp_{re}\,(x,y)$ are listed in units of the resampling bit number bit_num.

Advantageous Effects of Ninth Embodiment

In the information processing apparatus 2 according to the ninth embodiment, the specular reflection width $\rho l(x,y)$ is converted to the intensity of perception $\rho lp(x,y)$ of specular reflection width in accordance with the visual characteristics (visual characteristic curve) corresponding to the mean value of the specular reflection intensity $\rho s(x,y)$. In the information processing apparatus 2 according to the ninth embodiment, the amount of data of material appearance information is reduced by resampling the converted intensity of perception $\rho lp(x,y)$ of specular reflection width. With resampling in accordance with the above-described human visual characteristics (visual characteristic curve), it is possible to reduce the amount of data of material appearance information with less image quality degradation at the time of material appearance reproduction.

Tenth Embodiment

Next, a tenth embodiment will be described. In the following description of the tenth embodiment, the description of the same matter as that of the above-described first to ninth embodiments is omitted, and a matter different from that of the above-described first to ninth embodiments will be mainly described.

In the eighth embodiment, the specular reflection intensity $\rho s(x,y)$ is uniformly resampled over the entire image by using a visual characteristic curve corresponding to the mean value of the specular reflection width $\rho l(x,y)$. In the ninth embodiment, the specular reflection width $\rho l(x,y)$ is uniformly resampled over the entire image by using a visual characteristic curve corresponding to the mean value of the specular reflection intensity $\rho s(x,y)$. Also, a different visual characteristic curve may be used depending on a position. Therefore, in the tenth embodiment, an information processing apparatus that resamples the specular reflection intensity $\rho s(x,y)$ by using visual characteristics (visual characteristic curve) according to the specular reflection width $\rho l(x,y)$ at each position will be described.

The hardware components of the information processing apparatus 2 according to the tenth embodiment are similar to the hardware components of the information processing apparatus 2 according to the first embodiment, shown in FIG. 4. The logical components of the information processing apparatus 2 according to the tenth embodiment are also similar to the logical components of the information processing apparatus 2 according to the eighth embodiment, shown in FIG. 24.

Here, the logical components of the information processing apparatus 2 according to the tenth embodiment will be described with reference to FIG. 24. The material appearance information acquisition unit 2401 acquires material appearance information including information indicating a specular reflection intensity $\rho s(x,y)$ and information indicating a specular reflection width $\rho l(x,y)$. The specular reflection information conversion unit 2402 converts the specular reflection intensity $\rho s(x,y)$ to the intensity of perception $\rho sp(x,y)$ of specular reflection intensity in accordance with visual characteristics (visual characteristic curve) of the specular reflection intensity $\rho s(x,y)$ to a gloss intensity for the specular reflection width $\rho l(x,y)$ at each position (x,y). The resampling unit 2403 creates specular reflection information $\rho s_{comp}(x,y)$ reduced in the amount of data used, by resampling the intensity of perception $\rho sp(x,y)$ of specular reflection intensity obtained by the specular reflection information conversion unit 2402.

Process that is Executed by Information Processing Apparatus 2

Figure 28:
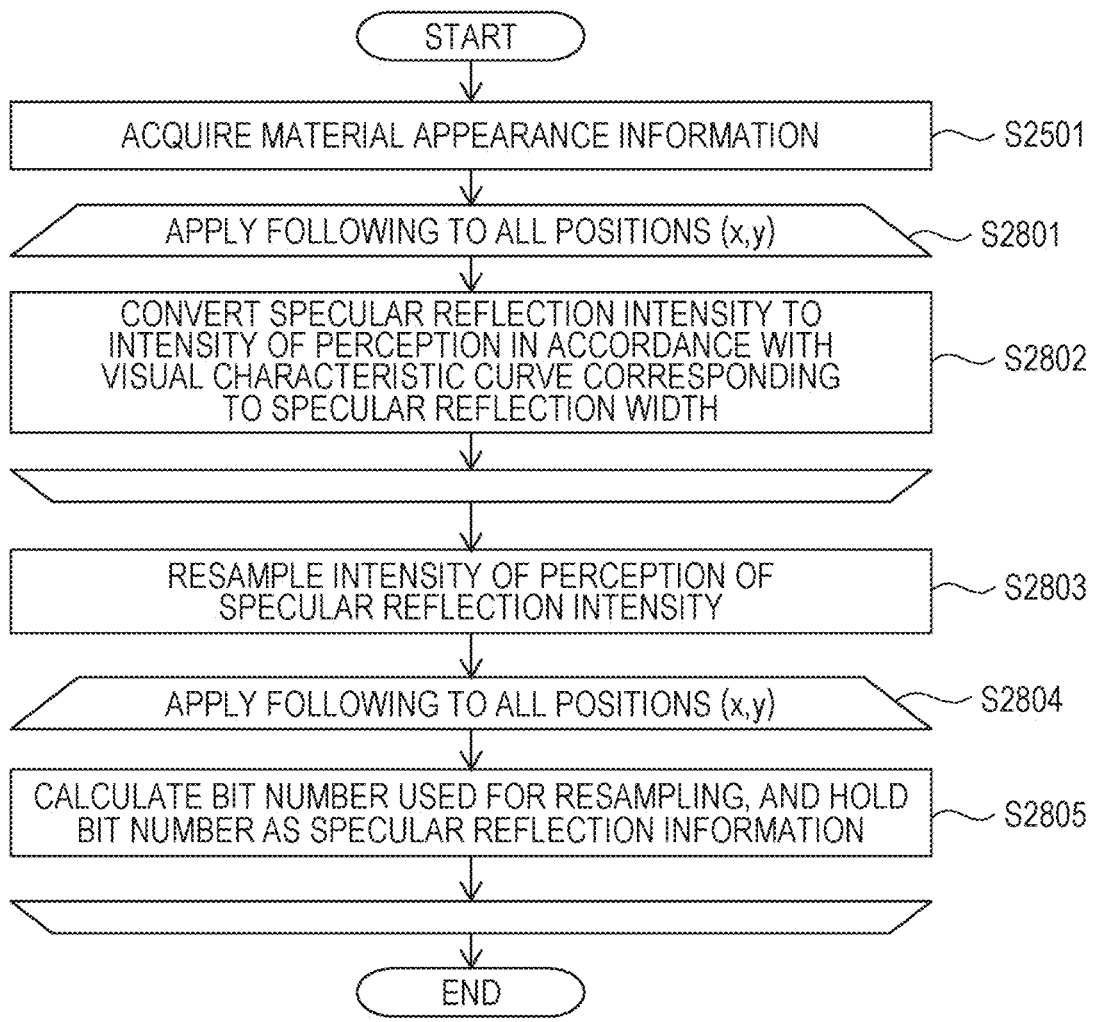
FIG. 28 is a flowchart that shows an example of a process that is executed by an information processing apparatus according to a tenth embodiment.

FIG. 28 is a flowchart that shows an example of a procedure of an information processing method that is executed by the information processing apparatus 2 according to the tenth embodiment. In FIG. 28, like step numbers are assigned to steps similar to the steps shown in FIG. 25.

In S2501, the material appearance information acquisition unit 2401, as in the case of the eighth embodiment, acquires material appearance information including information indicating a specular reflection intensity $\rho s(x,y)$ and information indicating a specular reflection width $\rho l(x,y)$ from the data storage location in accordance with instructions from the user.

Subsequently, in S2801, the specular reflection information conversion unit 2402 executes S2802 for all the positions (x,y) that are the entire region.

In S2802, the specular reflection information conversion unit 2402 converts the specular reflection intensity $\rho s(x,y)$ acquired in S2501 to the intensity of perception $\rho sp(x,y)$ of specular reflection intensity in accordance with a visual characteristic curve corresponding to the specular reflection width $\rho l(x,y)$ acquired in S2501. In the present embodiment, the specular reflection intensity $\rho s(x,y)$ is converted to the intensity of perception $\rho sp(x,y)$ of specular reflection intensity according to the visual characteristic curve expressed by the following equation (29).

$$\rho_{sp(x,y)} = \sqrt{k_1 f(\rho_s(x,y)) + k_2 (g(\rho_l(x,y)))^2} \tag{29}$$

Subsequently, in S2803, the resampling unit 2403 resamples the intensity of perception $\rho sp(x,y)$ of specular reflection intensity, converted through S2801 and S2802. The detailed process of S2803 is similar to S2503 in the eighth embodiment, so the description thereof is omitted, but the intensity of perception of specular reflection intensity obtained by resampling is defined as a resampled specular reflection intensity perception intensity $\rho sp_{re}(x,y)$.

Subsequently, in S2804, the resampling unit 2403 executes S2805 over all the positions (x,y) that are the entire region.

Subsequently, in S2805, the resampling unit 2403 calculates a bit number used to represent the values of the resampled specular reflection intensity perception intensity $\rho sp_{re}(x,y)$ obtained in S2803 and holds specular reflection information $\rho s_{comp}(x,y)$ in accordance with the bit number. The details of S2805 will be described below.

Initially, the resampling unit 2403, for the specular reflection width $\rho l(x,y)$, obtains the maximum value and the minimum value of the resampled specular reflection intensity perception intensity $\rho sp_{re}(x,y)$ in a range (0 to 65535) that the specular reflection intensity can take, according to the following equations (30) and (31).

$$\rho_{sp_{re\_max}(x,y)} = \text{floor}\left(\frac{\sqrt{k_1 f(65535) + k_2(g(\rho_l(x,y)))^2}}{d}\right) \tag{30}$$

$$\rho_{sp_{re\_min}(x,y)} = \text{floor}\left(\frac{\sqrt{k_1 f(0) + k_2(g(\rho_l(x,y)))^2}}{d}\right) \tag{31}$$

A difference between $\rho sp_{re}$ max(x,y) in equation (30) and $\rho sp_{re}$ min(x,y) in equation (31) is the maximum range that the resampled specular reflection intensity perception intensity $\rho sp_{re}(x,y)$ for the specular reflection width $\rho l(x,y)$ takes at each position. With a bit number used for the representation, it is possible to represent the value of the resampled specular reflection intensity perception intensity $\rho sp_{re}(x,y)$ with the minimum number of bits. The resampling unit 2403 also calculates a resampling bit number bit_num(x,y) used to represent the resampled specular reflection intensity perception intensity $\rho sp_{re}(x,y)$ according to the following equation (32).

$$\text{bit\_num} = \text{ceil}\left(\log_2\left(\rho_{lp_{re\_max}(x,y)} - \rho_{lp_{re\_min}(x,y)}\right)\right) \tag{32}$$

Subsequently, the resampling unit 2403 sets specular reflection information $\rho s_{comp}(x,y)$ in accordance with the resampling bit number bit_num used to represent the values of the resampled specular reflection intensity perception intensity $\rho sp_{re}(x,y)$. Specifically, the resampling unit 2403 holds binary specular reflection information $\rho s_{comp}(x,y)$ in which values of the resampled specular reflection intensity perception intensity $\rho sp_{re}(x,y)$ are listed by using the resampling bit number bit_num(x,y).

When the process of S2805 ends, the process of the flowchart shown in FIG. 28 ends.

Advantageous Effects of Tenth Embodiment

In the information processing apparatus 2 according to the tenth embodiment, the specular reflection intensity $\rho s(x,y)$ is converted to the intensity of perception $\rho sp(x,y)$ of specular reflection intensity in accordance with the visual characteristics (visual characteristic curve) corresponding to the specular reflection width $\rho l(x,y)$ at each position (x,y). In the information processing apparatus 2 according to the tenth embodiment, the amount of data of material appearance information is reduced by resampling the converted intensity of perception $\rho sp(x,y)$ of specular reflection intensity. In the tenth embodiment, a further larger amount of data is reduced by independently determining a bit number used for each pixel (set an independent bit number for each position) according to a specular reflection intensity as compared to the eighth embodiment.

Eleventh Embodiment

Next, an eleventh embodiment will be described. In the following description of the eleventh embodiment, the description of the same matter as that of the above-described first to tenth embodiments is omitted, and a matter different from that of the above-described first to tenth embodiments will be mainly described.

In the eighth to tenth embodiments, the information processing apparatus that reduces the amount of data of specular reflection information in accordance with visual characteristics (visual characteristic curve) has been described. In the eleventh embodiment, a system that includes an information processing apparatus and an image generating apparatus that reconstructs original specular reflection information from specular reflection information reduced in the amount of data by the information processing apparatus and that generates an image when light source information and geometrical information are given from the user will be described.

Logical Components (Functional Components) of Information Processing Apparatus 2 and Image Generating Apparatus 3

Figure 29:
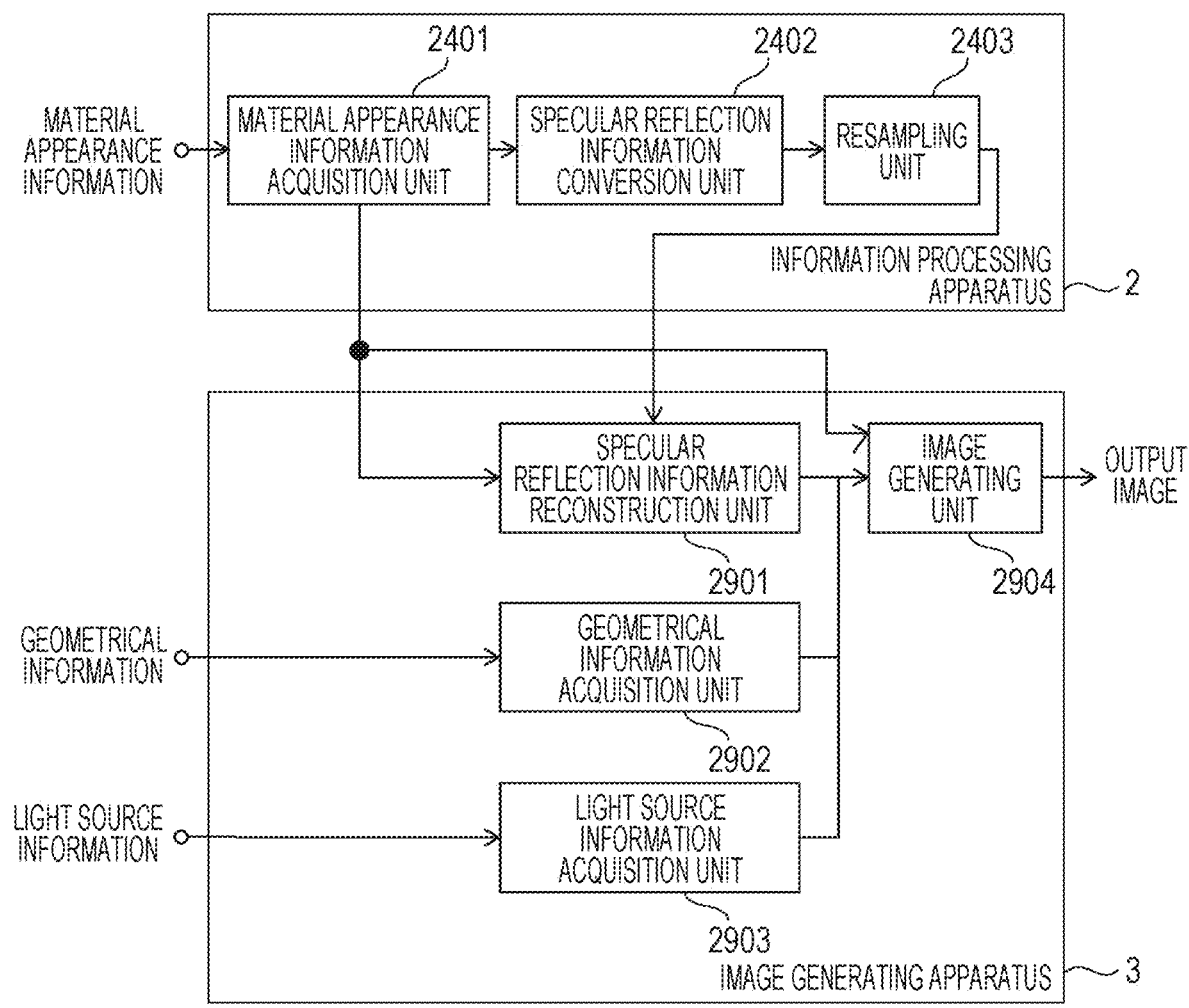
FIG. 29 is a diagram that shows an example of the logical components of an information processing apparatus and an image generating apparatus according to an eleventh embodiment.

FIG. 29 is a diagram that shows an example of the logical components of the information processing apparatus 2 and the image generating apparatus 3 according to the eleventh embodiment. Here, FIG. 29 shows an information processing system 1 configured to include the information processing apparatus 2 and the image generating apparatus 3. In FIG. 29, like reference signs denote components similar to the components shown in FIG. 24, and the detailed description thereof is omitted.

The information processing apparatus 2 according to the eleventh embodiment, shown in FIG. 29, has similar components to the logical components of the information processing apparatus 2 according to the eighth embodiment, shown in FIG. 24. In other words, as shown in FIG. 29, the information processing apparatus 2 according to the eleventh embodiment has logical components including the material appearance information acquisition unit 2401, the specular reflection information conversion unit 2402, and the resampling unit 2403. The information processing apparatus 2 according to the eleventh embodiment has similar components to the hardware components of the information processing apparatus 2 according to the first embodiment, shown in FIG. 4. At this time, the information processing apparatus 2 according to the eleventh embodiment functions as logical components 2401 to 2403 shown in FIG. 29 in a manner such that the CPU 201 shown in FIG. 4 executes computer-executable instructions stored in the ROM 202 using the RAM 203 as a work memory.

As shown in FIG. 29, the image generating apparatus 3 according to the eleventh embodiment has logical components including a specular reflection information reconstruction unit 2901, a geometrical information acquisition unit 2902, a light source information acquisition unit 2903, and an image generating unit 2904. The image generating apparatus 3 according to the eleventh embodiment, as in the case of, for example, the hardware components of the information processing apparatus 2 according to the first embodiment, shown in FIG. 4, has hardware components including a CPU, a ROM, a RAM, a general purpose I/F, a SATA I/F, and a VC.

At this time, the image generating apparatus 3 according to the eleventh embodiment functions as logical components 2901 to 2904 shown in FIG. 29 in a manner such that the CPU executes computer-executable instructions stored in the ROM using the RAM as a work memory.

Hereinafter, the logical components 2401 to 2403 of the information processing apparatus 2 according to the eleventh embodiment, shown in FIG. 29, and the logical components 2901 to 2904 of the image generating apparatus 3 according to the eleventh embodiment, shown in FIG. 29, will be described.

Initially, the logical components of the information processing apparatus 2 according to the eleventh embodiment, shown in FIG. 29, will be described.

The material appearance information acquisition unit 2401 acquires material appearance information including information indicating a diffuse reflection intensity $\rho d(x,y)$, information indicating a specular reflection intensity $\rho s(x,y)$, information indicating a specular reflection width $\sigma l(x,y)$, and information indicating a normal line $N(x,y)$.

The specular reflection information conversion unit 2402 converts the specular reflection intensity $\rho s(x,y)$ to the intensity of perception $\rho sp(x,y)$ of specular reflection intensity in accordance with visual characteristics (visual characteristic curve) of the specular reflection intensity $\rho s(x,y)$ for a gloss intensity for a mean value of the specular reflection width $\rho l(x,y)$.

The resampling unit 2403 creates specular reflection information $\rho s_{comp}(x,y)$ reduced in the amount of data used, by resampling the intensity of perception $\rho sp(x,y)$ of specular reflection intensity obtained by the specular reflection information conversion unit 2402.

Next, the logical components of the image generating apparatus 3 according to the eleventh embodiment, shown in FIG. 29, will be described.

The specular reflection information reconstruction unit 2901 reconstructs a specular reflection intensity $\rho's(x,y)$ expressed by an original physical quantity from the specular reflection information $\rho s_{comp}(x,y)$ reduced in the amount of data using the visual characteristic curve of the specular reflection intensity for the mean value of the specular reflection width $\rho l(x,y)$.

The geometrical information acquisition unit 2902 acquires geometrical information including information indicating a view vector $V=(Vx,Vy,Vz)$.

The light source information acquisition unit 2903 acquires light source information including information indicating a light source vector $L=(Lx,Ly,Lz)$ and information indicating a light source intensity E.

The image generating unit 2904 generates an image by using the information indicating the specular reflection intensity $\rho's(x,y)$ reconstructed by the specular reflection information reconstruction unit 2901, the material appearance information, the geometrical information, and the light source information. Here, the material appearance information includes the information indicating the diffuse reflection intensity $\rho d(x,y)$, the information indicating the specular reflection width $\sigma l(x,y)$, and the information indicating the normal line $N(x,y)$. The geometrical information includes the information indicating the view vector V. The light source information includes the information indicating the light source vector L and the information indicating the light source intensity E.

In the information processing system 1 shown in FIG. 29, a mode in which the specular reflection information reconstruction unit 2901 is configured in the image generating apparatus 3 is shown; however, some embodiments of the present disclosure are not limited to this mode. For example, the present disclosure also encompasses a mode in which the specular reflection information reconstruction unit 2901 is configured in the information processing apparatus 2.

Process that is Executed by Information Processing Apparatus 2 and Image Generating Apparatus 3

FIG. 30 is a flowchart that shows an example of a procedure of an information processing method that is executed by the information processing apparatus 2 and the image generating apparatus 3 according to the eleventh embodiment. In FIG. 30, like step numbers are assigned to steps similar to the steps shown in FIG. 25.

In S3001, the material appearance information acquisition unit 2401 acquires material appearance information from the data storage locations in accordance with instructions from the user. Specifically, in S3001, the material appearance information acquisition unit 2401 acquires material appearance information including information indicating a diffuse reflection intensity $\rho d(x,y)$, information indicating a specular reflection intensity $\rho s(x,y)$, information indicating a specular reflection width $\sigma l(x,y)$, and information indicating a normal line $N(x,y)$. The UI screen 1100 shown in FIG. 11 can be an example of a UI screen for acquiring material appearance information in S3001 of FIG. 30. In the present embodiment, the information indicating the diffuse reflection intensity ρd(x,y), the information indicating the specular reflection intensity ρs(x,y), and the information indicating the specular reflection width σl(x,y) are expressed in a 16-bit gray scale image format, and a value of each piece of data (information) is associated with a range of 0 to 65535. In the present embodiment, the information indicating the normal line N(x,y) is expressed in a 16-bit RGB image format. At this time, an x component (in the range of −1 to 1) of a normal line is associated with an R component (in the range of 0 to 65535) of an image. A y component (in the range of −1 to 1) of the normal line is associated with a G component (in the range of 0 to 65535) of the image. A z component (in the range of −1 to 1) of the normal line is associated with a B component (in the range of 0 to 65535) of the image.

Here, a further description of FIG. 30 will be made.

Subsequently, S2502, S2503, and S2504 are similar to the process in the eighth embodiment, shown in FIG. 25, so the description thereof is omitted. Through the processes of S2502 to S2504, the specular reflection information $ρs_{comp}$ (x,y) reduced in the amount of data used is created.

Subsequently, in S3002, the specular reflection information reconstruction unit 2901 reconstructs a specular reflection intensity ρ's(x,y) as a physical quantity from the specular reflection information $ρs_{comp}$ (x,y). Specifically, the specular reflection information reconstruction unit 2901 reads data in units of resampling bit number b from the specular reflection information $ρs_{comp}$ (x,y) and obtains an intensity of perception ρ'sp(x,y) of specular reflection intensity before resampling according to the sampling width d using the following equation (33).

$$ρ'_{sp}(x,y) = dρ_{s_{comp}}(x,y) \qquad (33)$$

Subsequently, the specular reflection information reconstruction unit 2901 reconstructs a specular reflection intensity ρ's(x,y) in a physical quantity that can be expressed by the following equation (34) from the intensity of perception ρ'sp(x,y) of specular reflection intensity in accordance with the visual characteristic curve.

$$ρ'_{s(x,y)} = \frac{1}{k_1 k_3}\left(k_2(g(ρ_{l_{ave}}))^2 - (ρ'_{sp(x,y)})^2\right) \qquad (34)$$

Subsequently, in S3003, the geometrical information acquisition unit 2902 acquires geometrical information including information indicating a view vector V=(Vx,Vy,Vz). In S3003, the light source information acquisition unit 2903 acquires light source information including information indicating a light source vector L=(Lx,Ly,Lz) and information indicating a light source intensity E. The UI screen 1100 shown in FIG. 11 can be an example of a UI screen for acquiring geometrical information and light source information in S3003 of FIG. 30.

Subsequently, in S3004, the image generating unit 2904 generates an output image I(x,y) by using the information indicating the specular reflection intensity ρ's(x,y) reconstructed in S3002, the material appearance information, the geometrical information, and the light source information. Here, the material appearance information includes the information indicating the diffuse reflection intensity ρd(x,y), the information indicating the specular reflection width σl(x,y), and the information indicating the normal line N(x,y). The geometrical information includes the information indicating the view vector V. The light source information includes the information indicating the light source vector L and the information indicating the light source intensity E. Specifically, the image generating unit 2904 calculates and generates an output image I(x,y) according to equation (35) based on Lambert's cosine law for diffuse reflection and a model of Blinn-Phong for specular reflection.

$$I(x,y) = E(ρ_d(x,y)dot(N(x,y),L) + ρ'_s(x,y)dot(N(x,y),H)^{1-ρl(x,y)}) \qquad (35)$$

In equation (35), dot(•,•) represents the inner product of vectors, and, when the inner product is negative, is replaced with 0. In equation (35), H is a vector (half vector) intermediate between the light source vector L and the view vector V and is calculated according to H=(L+V)/|L+V|.

When the process of S3004 ends, the process of the flowchart shown in FIG. 30 end.

Advantageous Effects of Eleventh Embodiment

In the information processing apparatus 2 according to the eleventh embodiment, the specular reflection intensity ρs(x,y) is converted to the intensity of perception ρsp(x,y) of specular reflection intensity in accordance with the visual characteristics (visual characteristic curve) corresponding to the mean value of the specular reflection width ρl(x,y). Subsequently, in the information processing apparatus 2 according to the eleventh embodiment, the specular reflection information $ρs_{comp}$(x,y) reduced in the amount of data is created by resampling the converted intensity of perception ρsp(x,y) of specular reflection intensity. In the image generating apparatus 3 according to the eleventh embodiment, information indicating an original specular reflection intensity is reconstructed from the specular reflection information $ρs_{comp}$(x,y) reduced in the amount of data by using the visual characteristic curve corresponding to the mean value of the specular reflection width ρl(x,y). Subsequently, in the image generating apparatus 3 according to the eleventh embodiment, an image is generated by using the information indicating the reconstructed specular reflection intensity, the material appearance information, the geometrical information, and the light source information. Thus, it is possible to generate a material appearance image for the geometrical information and the light source information, given from the user, from the specular reflection information reduced in the amount of data in the information processing apparatus 2.

Twelfth Embodiment

Next, a twelfth embodiment will be described. In the following description of the twelfth embodiment, the description of the same matter as that of the above-described first to eleventh embodiments is omitted, and a matter different from that of the above-described first to eleventh embodiments will be mainly described.

In the eleventh embodiment, the image generating apparatus 3 that generates an image using specular reflection information generated in the information processing apparatus 2 according to the eighth embodiment has been described. In the twelfth embodiment, the image generating apparatus 3 that generates an image using specular reflection information generated in the information processing apparatus 2 according to the tenth embodiment will be described.

The hardware components of the information processing apparatus 2 according to the twelfth embodiment are similar to the hardware components of the information processing apparatus 2 according to the first embodiment, shown in FIG. 4. The logical components of the information processing apparatus 2 according to the twelfth embodiment are also similar to the logical components of the information processing apparatus 2 according to the eleventh embodiment, shown in FIG. 29.

The hardware components of the image generating apparatus 3 according to the twelfth embodiment are similar to the hardware components of the image generating apparatus 3 according to the eleventh embodiment. The logical components of the image generating apparatus 3 according to the twelfth embodiment are similar to the logical components of the image generating apparatus 3 according to the eleventh embodiment, shown in FIG. 29.

The specular reflection information reconstruction unit 2901 according to the twelfth embodiment reconstructs a specular reflection intensity ρ's(x,y) expressed by an original physical quantity from the specular reflection information $\rho s_{comp}(x,y)$ reduced in the amount of data using the visual characteristic curve corresponding to the specular reflection width ρl(x,y) at each position.

The image generating unit 2904 according to the twelfth embodiment generates an image by using the reconstructed specular reflection intensity ρ's(x,y), the diffuse reflection intensity ρd(x,y), the specular reflection width σl(x,y), the normal line N(x,y), the view vector V, the light source vector V, and the light source intensity E.

Process that is Executed by Information Processing Apparatus 2 and Image Generating Apparatus 3

FIG. 31 is a flowchart that shows an example of a procedure of an information processing method that is executed by the information processing apparatus 2 and the image generating apparatus 3 according to the twelfth embodiment. In FIG. 31, like step numbers are assigned to steps similar to the steps shown in FIGS. 25 and 28.

In S2501, the material appearance information acquisition unit 2401, as in the case of the eighth embodiment, acquires material appearance information including information indicating a specular reflection intensity ρs(x,y) and information indicating a specular reflection width ρl(x,y) from the data storage location in accordance with instructions from the user.

Subsequently, S2801, S2802, S2803, S2804, and S2805 are similar to the process in the tenth embodiment, shown in FIG. 28, so the description thereof is omitted. Through the processes of S2801 to S2805, the specular reflection information $\rho s_{comp}(x,y)$ reduced in the amount of data used is created.

Subsequently, in S3101, the specular reflection information reconstruction unit 2901 reconstructs a specular reflection intensity ρ's(x,y) as a physical quantity from the specular reflection information $\rho s_{comp}(x,y)$. Specifically, initially, the specular reflection information reconstruction unit 2901 reads data in units of resampling bit number bit_num(x,y) according to the specular reflection width ρl(x,y) from the specular reflection information $\rho s_{comp}(x,y)$. Subsequently, the specular reflection information reconstruction unit 2901 obtains an intensity of perception ρ'sp(x,y) of specular reflection intensity before resampling by using the sampling width d using equation (33). Subsequently, the specular reflection information reconstruction unit 2901 reconstructs a specular reflection intensity ρ's(x,y) in a physical quantity expressed by equation (34) from the intensity of perception p'sp(x,y) of specular reflection intensity in accordance with the visual characteristic curve.

Subsequently, in S3102, the geometrical information acquisition unit 2902 acquires geometrical information including information indicating a view vector V=(Vx,Vy,Vz). In S3102, the light source information acquisition unit 2903 acquires light source information including information indicating a light source vector L=(Lx,Ly,Lz) and information indicating a light source intensity E. The UI screen 1100 shown in FIG. 11 can be an example of a UI screen for acquiring geometrical information and light source information in S3102 of FIG. 31.

Subsequently, in S3103, the image generating unit 2904 generates an output image I(x,y) by using the information indicating the specular reflection intensity ρ's(x,y) reconstructed in S3101, the material appearance information, the geometrical information, and the light source information. Here, the material appearance information includes the information indicating the diffuse reflection intensity ρd(x,y), the information indicating the specular reflection width σl(x,y), and the information indicating the normal line N(x,y). The geometrical information includes the information indicating the view vector V. The light source information includes the information indicating the light source vector L and the information indicating the light source intensity E. Specifically, the image generating unit 2904 calculates and generates an output image I(x,y) according to equation (35).

When the process of S3103 ends, the process of the flowchart shown in FIG. 31 ends.

Advantageous Effects of Twelfth Embodiment

In the information processing apparatus 2 according to the twelfth embodiment, the specular reflection intensity ρs(x,y) is converted to the intensity of perception ρsp(x,y) of specular reflection intensity in accordance with the visual characteristics (visual characteristic curve) corresponding to the diffuse reflection width σl(x,y) at each position (x,y). Subsequently, in the information processing apparatus 2 according to the twelfth embodiment, the specular reflection information $\rho s_{comp}(x,y)$ reduced in the amount of data is created by resampling the converted intensity of perception ρsp(x,y) of specular reflection intensity. In the image generating apparatus 3 according to the twelfth embodiment, information indicating an original specular reflection intensity is reconstructed from the specular reflection information $\rho s_{comp}(x,y)$ reduced in the amount of data by using the visual characteristic curve corresponding to the diffuse reflection width σl(x,y) at each position (x,y). Subsequently, in the image generating apparatus 3 according to the twelfth embodiment, an image is generated by using the information indicating the reconstructed specular reflection intensity, the material appearance information, the geometrical information, and the light source information. Thus, it is possible to generate a material appearance image for the geometrical information and the light source information, given from the user, from the specular reflection information reduced in the amount of data in the information processing apparatus 2.

Other Embodiments

In the above-described embodiments, a normal line that represents the orientation of a physical object surface (which may be shape information of a subject) is used. Also, a height map may be used. Then, the height map is differentiated inside and converted to a normal line, and then a process is executed.

In the above-described embodiments, the diffuse reflection intensity ρd, the specular reflection intensity ρs, and the specular reflection width al are handled in a gray scale. Also, a diffuse reflection intensity, a specular reflection intensity, and a specular reflection width may be input for each of RGB, and then the data amount reduction process may be applied. In this case, for example, the data amount reduction process may be applied one by one for the colors of RGB.

In the first to fourth embodiments, the contrast gloss c in an Lcd space is used at the time of converting the specular reflection intensity to the intensity of perception. Also, another visual characteristic curve may be used.

In the above-described embodiments, the function of the visual characteristic curve is used at the time of converting the specular reflection intensity or the specular reflection width to the intensity of perception. Also, a LUT that represents a correspondence between intensity and intensity of perception may be generated, and conversion may be performed in accordance with the LUT.

In the above-described embodiments, it is assumed that material appearance information includes information indicating a diffuse reflection intensity, information indicating a specular reflection intensity, information indicating a specular reflection width, and information indicating a normal line. Also, material appearance information may include another piece of information according to material appearance intended to be expressed, such as an anisotropic map indicating a distribution direction of specular reflection.

In the above-described embodiments, an 8-bit image format or a 16-bit image format is used for material appearance information. Also, information in another format (such as a binary file in which pieces of data are listed, and text data) may be used as material appearance information.

In the above-described embodiments, a Blinn-Phong model is used as a model equation of specular reflection light in editing model material appearance. Also, another model equation, such as a Torrance-Sparrow model and approximation using a Gaussian function, may be used.

In some of the above-described embodiments, specular reflection width information is used as input. Also, reflection characteristic data of a physical object as shown in FIG. 1 may be used as input, and a specular reflection width may be calculated in accordance with the input reflection characteristic data of the physical object.

In some of the above-described embodiments, a specular reflection width is handled in a 16-bit gray scale image. Also, another image format (such as an 8-bit image format) or information in another format (such as a binary file in which pieces of data are listed and text data) may be used. In some of the above-described embodiments, the specular reflection width is set to a range of 0[Deg] to 90[Deg]; however, the range of the specular reflection width may be selectively designated.

In the above-described embodiments, a method of reducing the amount of data for each of the specular reflection intensity and the specular reflection width has been described. Also, the amount of data may be reduced for both the specular reflection intensity and the specular reflection width.

According to the embodiments of the present disclosure, it is possible to reduce the amount of data of material appearance information with reduced image quality degradation at the time of material appearance reproduction.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-116600, which was filed on Jul. 21, 2022 and which is hereby incorporated by reference herein in its entirety.

What is claimed is:

1. An information processing apparatus comprising:
one or more memories; and
one or more processors, wherein the one or more processors and the one or more memories are configured to:
acquire material appearance information including specular reflection information;
convert the specular reflection information to an intensity of perception in accordance with visual characteristics for a gloss intensity;
set a bit number used in resampling such that the bit number used in resampling is smaller than a bit number of the specular reflection information; and
resample the intensity of perception.

2. The information processing apparatus according to claim 1, wherein the specular reflection information includes at least one of information indicating a specular reflection intensity and information indicating a spread of specular reflection.

3. The information processing apparatus according to claim 2, wherein the one or more processors and the one or more memories are further configured to:
acquire diffuse reflection information including information indicating a diffuse reflection intensity, in addition to the specular reflection information including information indicating the specular reflection intensity, as the material appearance information; and
convert the information indicating the specular reflection intensity to the intensity of perception in accordance with the visual characteristics corresponding to the diffuse reflection intensity.

4. The information processing apparatus according to claim 3, wherein the one or more processors and the one or more memories are further configured to convert the information indicating the specular reflection intensity to the intensity of perception in accordance with the visual characteristics corresponding to a minimum value of the diffuse reflection intensity.

5. The information processing apparatus according to claim 3, wherein the one or more processors and the one or more memories are further configured to convert the information indicating the specular reflection intensity to the intensity of perception in accordance with the visual characteristics corresponding to the diffuse reflection intensity at each position.

6. The information processing apparatus according to claim 3, wherein the visual characteristics are characteristics such that a sensitivity to the specular reflection intensity reduces as the diffuse reflection intensity increases.

7. The information processing apparatus according to claim 2, wherein the visual characteristics are nonlinear characteristics such that an amount of change in glossiness reduces as the spread of the specular reflection increases.

8. The information processing apparatus according to claim 2, wherein the one or more processors and the one or more memories are further configured to convert the information indicating the specular reflection intensity to the intensity of perception in accordance with the visual characteristics corresponding to the spread of the specular reflection.

9. The information processing apparatus according to claim 8, wherein the one or more processors and the one or more memories are further configured to, in accordance with the visual characteristics corresponding to a mean value of the spread of the specular reflection, convert the information indicating the specular reflection intensity to the intensity of perception.

10. The information processing apparatus according to claim 2, wherein the one or more processors and the one or more memories are further configured to convert the information indicating the spread of the specular reflection to the intensity of perception in accordance with the visual characteristics corresponding to the specular reflection intensity.

11. The information processing apparatus according to claim 10, wherein the one or more processors and the one or more memories are further configured to convert the information indicating the spread of the specular reflection to the intensity of perception in accordance with the visual characteristics corresponding to a mean value of the specular reflection intensity.

12. The information processing apparatus according to claim 1, wherein the one or more processors and the one or more memories are further configured to set the bit number used in resampling for an entire region.

13. The information processing apparatus according to claim 1, wherein the one or more processors and the one or more memories are further configured to set the bit number used in resampling independently for each position.

14. The information processing apparatus according to claim 1,
wherein the specular reflection information includes at least one of information indicating a specular reflection intensity and information indicating a spread of specular reflection, and
wherein the one or more processors and the one or more memories are further configured to set the bit number used in resampling such that the bit number used in resampling reduces as the specular reflection intensity increases or as the spread of the specular reflection increases.

15. The information processing apparatus according to claim 1, wherein the one or more processors and the one or more memories are further configured to reconstruct the specular reflection information from information obtained by resampling the intensity of perception.

16. An information processing method comprising:
acquiring material appearance information including specular reflection information;
converting the specular reflection information to an intensity of perception in accordance with visual characteristics for a gloss intensity;
setting a bit number used in resampling such that the bit number used in resampling is smaller than a bit number of the specular reflection information; and
resampling the intensity of perception.

17. A non-transitory computer-readable storage medium storing instructions that, when executed by a computer, cause the computer to perform an information processing method, the information processing method comprising:
acquiring material appearance information including specular reflection information;
converting the specular reflection information to an intensity of perception in accordance with visual characteristics for a gloss intensity;
setting a bit number used in resampling such that the bit number used in resampling is smaller than a bit number of the specular reflection information; and
resampling the intensity of perception.

* * * * *